(12) United States Patent
Lin et al.

(10) Patent No.: US 10,337,831 B2
(45) Date of Patent: Jul. 2, 2019

(54) SIGHT AND COMPENSATING MECHANISM THEREOF

(71) Applicants: Sintai Optical (Shenzhen) Co., Ltd., ShenZhen, Guandong Province (CN); Asia Optical Co., Inc., Taichung (TW)

(72) Inventors: Yung-Chin Lin, Taichung (TW); Hao Tu, Taichung (TW); Sung-Po Cheng, Taichung (TW)

(73) Assignees: SINTAI OPTICAL (SHENZHEN) CO., LTD., Shenzhen, Guangdong Province (CN); ASIA OPTICAL CO., INC., Taichung (TW)

(*) Notice: Subject to any disclaimer, the term of this patent is extended or adjusted under 35 U.S.C. 154(b) by 0 days.

(21) Appl. No.: 15/854,927

(22) Filed: Dec. 27, 2017

(65) Prior Publication Data
US 2018/0180383 A1    Jun. 28, 2018

(30) Foreign Application Priority Data

Dec. 28, 2016 (CN) .......................... 2016 1 1238779
Dec. 15, 2017 (CN) .......................... 2017 1 1344653

(51) Int. Cl.
*F41G 1/38* (2006.01)
*G02B 7/02* (2006.01)
*G02B 23/14* (2006.01)

(52) U.S. Cl.
CPC .............. *F41G 1/38* (2013.01); *G02B 7/023* (2013.01); *G02B 23/14* (2013.01)

(58) Field of Classification Search
CPC ........................................................ F41G 1/38
See application file for complete search history.

(56) References Cited

U.S. PATENT DOCUMENTS

| 8,919,026 | B2* | 12/2014 | Hamilton | F41G 1/38 42/119 |
|---|---|---|---|---|
| 9,170,068 | B2* | 10/2015 | Crispin | F41G 1/16 |
| 9,677,848 | B2* | 6/2017 | Hamilton | F41G 1/38 |
| 10,132,593 | B2* | 11/2018 | White | F41G 1/38 |
| 2017/0211912 | A1* | 7/2017 | Hamilton | F41G 1/38 |
| 2017/0328674 | A1* | 11/2017 | VanBecelaere | F41G 1/38 |

* cited by examiner

*Primary Examiner* — Joshua T Semick
(74) *Attorney, Agent, or Firm* — McClure, Qualey & Rodack, LLP

(57) ABSTRACT

A compensating mechanism includes a base, an adjusting unit, an adjusting cap and a stop unit. The adjusting unit is disposed on the base. The adjusting cap is configured to move the adjusting unit with respect to the base so as to form a first circumferential movement range. The stop unit includes a sliding element and a limiting element, wherein the limiting element includes a movement region, and the adjusting cap is configured to move the sliding element along the movement region so as to form a second circumferential movement range. A sum of a first central angle corresponding to the first circumferential movement range and a second central angle corresponding to the second circumferential movement range is a fixed value. The invention also provides a sight, wherein the sight includes a main body, an objective unit, an ocular unit, an inner lens barrel and the compensating mechanism.

11 Claims, 21 Drawing Sheets

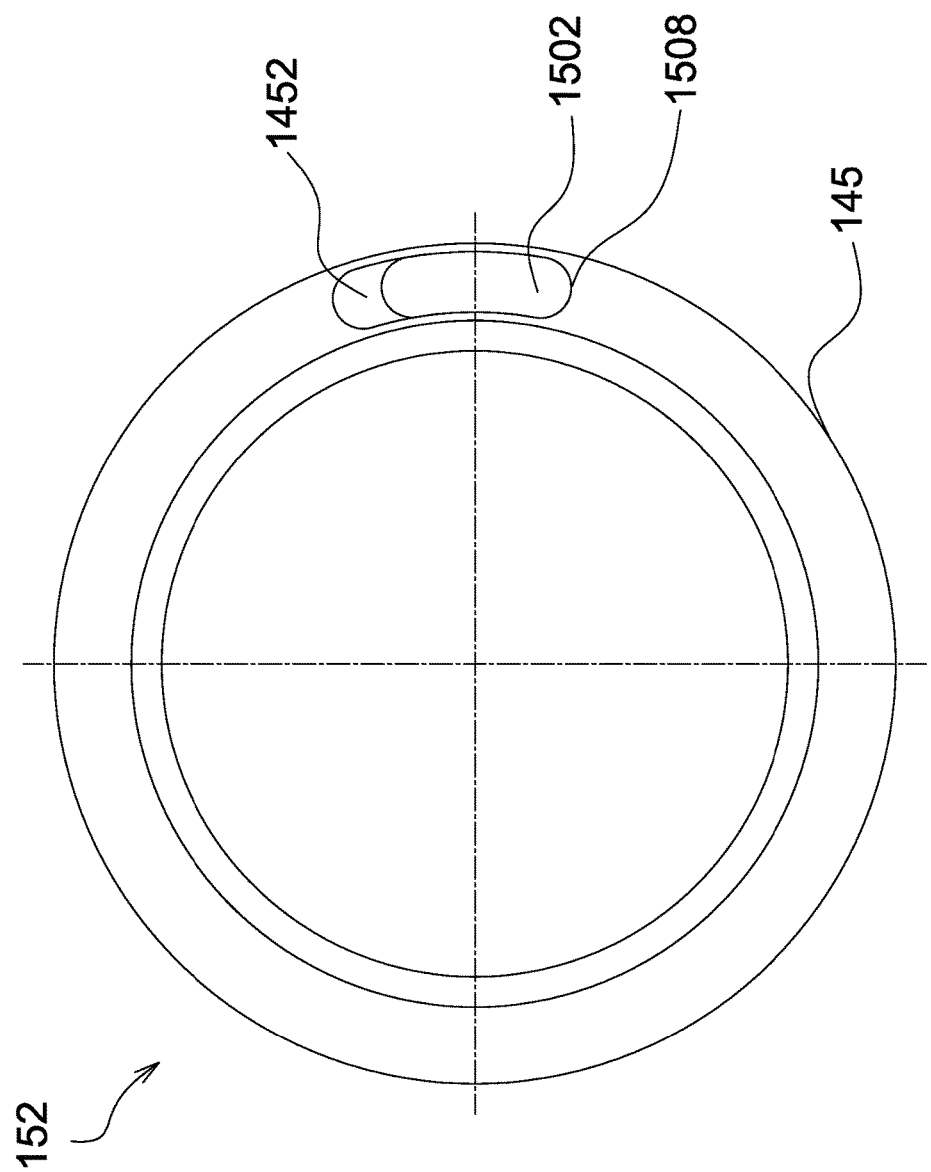

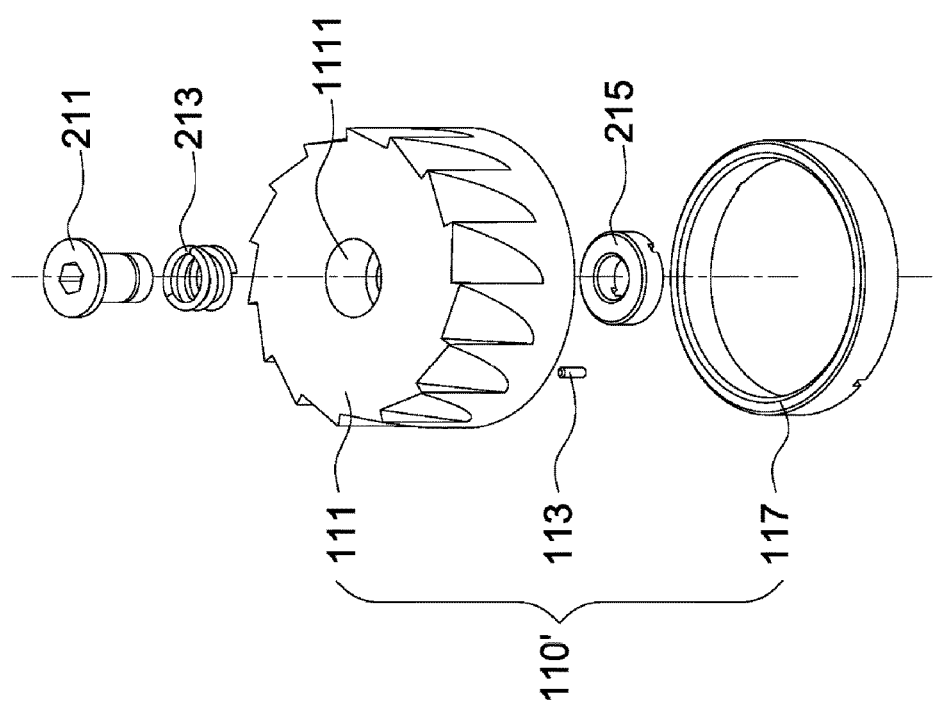

SIGHT AND COMPENSATING MECHANISM
THEREOF

BACKGROUND OF THE INVENTION

Field of the Invention

The invention relates to a sight and compensating mechanism thereof, and more particularly to a compensating mechanism having a "zero stop" function.

Description of the Related Art

Generally, a conventional sight is provided with an elevation or windage compensating mechanism for correcting bullet impact points. Before bullet impact points are corrected, setting a zero point for the compensating mechanism is required wherein the zero point is set by adjusting an adjusting screw of the compensating mechanism to be in a reference position and adjusting an adjusting cap of the compensating mechanism to be in a zero-point position. After setting the zero point is completed, a user is able to operate the compensating mechanism to correct the bullet impact point. However, when correcting the bullet impact point for a new target at different distance is desired, adjusting the compensating mechanism back to the zero-point-set state may become difficult because the adjusting cap have been rotated a number of times.

To address the above problem, a prior compensating mechanism commonly has a "zero stop" function. If a return of the adjusting screw to the reference position is desired, a user only needs to rotate the adjusting cap in a reverse direction until the adjusting cap is stopped. The adjusting cap of the compensating mechanism is usually provided with a stop element (e.g. a pin) for achieving the described "zero stop" function. During rotation of the adjusting cap in the reverse direction, the adjusting cap is constrained by the stop element and stopped in the zero-point position so as to achieve the "zero stop" function.

In above described structure, the prior compensating mechanism achieves the "zero stop" function by means of the stop element. However, a new issue is caused. Specifically, the adjusting cap is constrained by the stop element and can be only rotated through an angle less than 360 degrees relative to the zero-point position. That is inconvenient in use.

BRIEF SUMMARY OF THE INVENTION

The invention provides a sight and compensating mechanism thereof. The compensating mechanism has a "zero stop" function, and the adjusting cap of the compensating mechanism is stopped from rotating after a full rotation (360 degrees) in a single direction.

The compensating mechanism in accordance with an embodiment of the invention includes a base, an adjusting unit, an adjusting cap and a stop unit. The adjusting unit disposed on the base. The adjusting cap is connected to the adjusting unit and is configured to rotate and move the adjusting unit with respect to the base so as to form a first circumferential movement range. The stop unit is connected to the base and includes a sliding element and a limiting element, wherein the limiting element includes a limiting portion, the limiting portion includes a movement region, and the adjusting cap is configured to move the sliding element along the movement region so as to form a second circumferential movement range. A sum of a first central angle corresponding to the first circumferential movement range and a second central angle corresponding to the second circumferential movement range is a fixed value.

In yet another embodiment, the adjusting cap includes a gap, the gap has a first end and a second end, and the adjusting cap is configured to move the sliding element along the gap and between the first end and the second end. The limiting portion is a limiting slot, and the sliding element is configured to move along the limiting slot.

In another embodiment, the limiting slot has a third end and a fourth end, and the sliding element is configured to move along the limiting slot and between the third end and the fourth end.

In yet another embodiment, a first curved path along which the sliding element moves from the first end to the second end corresponds to the first circumferential movement range, a second curved path along which the sliding element moves from the third end to the fourth end corresponds to the second circumferential movement range, and the sum of the first central angle and the second central angle is 360 degrees.

In another embodiment, the adjusting cap is limited by the sliding element to rotate in a single direction when the sliding element is placed against both the first end of the gap and the third end of the limiting slot.

In yet another embodiment, the adjusting cap is limited by the sliding element to rotate in a reverse direction of the single direction when the sliding element is placed against both the second end of the gap and the fourth end of the limiting slot.

In another embodiment, the stop unit further includes a stop ring disposed around the base and having a sliding slot, wherein the sliding element includes a pin portion and a base portion, the base portion is movably disposed in the sliding slot, the pin portion movably penetrates through the limiting slot and into the gap, and the limiting element is firmly disposed on the stop ring.

In yet another embodiment, the compensating mechanism is an elevation compensating mechanism or a windage compensating mechanism.

In another embodiment, the compensating mechanism further includes a limiting bolt, an elastic element and a connecting element, wherein the limiting bolt penetrates through the elastic element and the connecting element and is fixed to the adjusting unit, the elastic element is compressed between the limiting bolt and the connecting element in an amount of compression and generates a restoring force, one end of the elastic element is disposed against a flange portion of the limiting bolt, the other end of the elastic element is disposed against a bottom portion of the connecting element, and the connecting element is forced against the adjusting unit by the restoring force.

In yet another embodiment, the adjusting cap is detachably connected to the connecting element, and the adjusting cap and the connecting element are allowed to move with respect to the adjusting unit until the amount of compression reaches a predetermined value.

In another embodiment, when the amount of compression achieves the predetermined value, the sliding element is outside the gap to avoid the sliding element from pushing against the first end or the second end of the gap during operation of the adjusting cap.

In yet another embodiment, the adjusting cap includes an abutting element and is configured to move the abutting element in a circumferential direction of the adjusting cap so as to form the first circumferential movement range. The limiting element is ring-shaped, the limiting portion is an opening portion having a first end portion and a second end portion, and the sliding element is configured to move between the first end portion and the second end portion so as to form the second circumferential movement range.

In another embodiment, the compensating mechanism further includes a limiting screw and an elastic element, wherein the limiting screw penetrates through the elastic element and the adjusting cap and is fixed to the adjusting unit, the elastic element is compressed between the limiting screw and the adjusting cap and generates a restoring force, and the adjusting cap is pushed by the restoring force to stay in a first position.

In yet another embodiment, the sliding element has a stop portion and a sliding portion, when the adjusting cap stays in the first position, the abutting element is configured to push against the stop portion for moving the sliding portion between the first end portion and the second end portion, and the adjusting cap is configured to move the adjusting unit with respect to the base.

In another embodiment, the stop portion has a first side and a second side, when the sliding portion is placed against the first end portion, the abutting element is allowed to move from the first side to the second side along a first curved path, when the sliding portion is moved from the first end portion to the second end portion, the abutting element contacting the second side is moved along a second curved path. The first curved path corresponds to the first circumferential movement range, the second curved path corresponds to the second circumferential movement range, and the sum of the first central angle and the second central angle is 360 degrees.

In yet another embodiment, when the sliding portion is placed against the first end portion and the abutting element is placed against the first side, the adjusting cap is limited to rotate in a single direction.

In another embodiment, when the sliding portion is placed against the second end portion and the abutting element is placed against the second side, the adjusting cap is limited to rotate in a reverse direction of the single direction.

In yet another embodiment, the elastic element is compressed in an amount of compression, and the adjusting cap is allowed to move with respect to the adjusting unit until the amount of compression reaches a predetermined value to stop the adjusting cap in a second position.

In another embodiment, the stop unit further includes a limiting member having a first end and a second end, the first end is fixed to the stop ring, and the second end is configured to push against the sliding element so that the sliding element is forced against the first end portion.

The sight in accordance with an embodiment of the invention includes a main body, an objective unit, an ocular unit, an inner lens barrel and the compensating mechanism described above. The main body includes a first end portion and a second end portion. The objective unit is connected to the first end portion. The ocular unit is connected to the second end portion. The inner lens barrel is disposed within the main body and between the objective unit and the ocular unit and includes a plurality of lenses, wherein the objective unit, the inner lens barrel and the ocular unit constitute an optical axis. The compensating mechanism is disposed on the main body and against outer circumferential surfaces of the inner lens barrel so as to adjust the optical axis A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5D is a schematic view of a base portion of the FIG. 3 disposed in a sliding slot of a stop ring;

FIG. 13 is an exploded view of the adjusting cap of the FIG. 9.

DETAILED DESCRIPTION OF THE INVENTION

Figure 1:
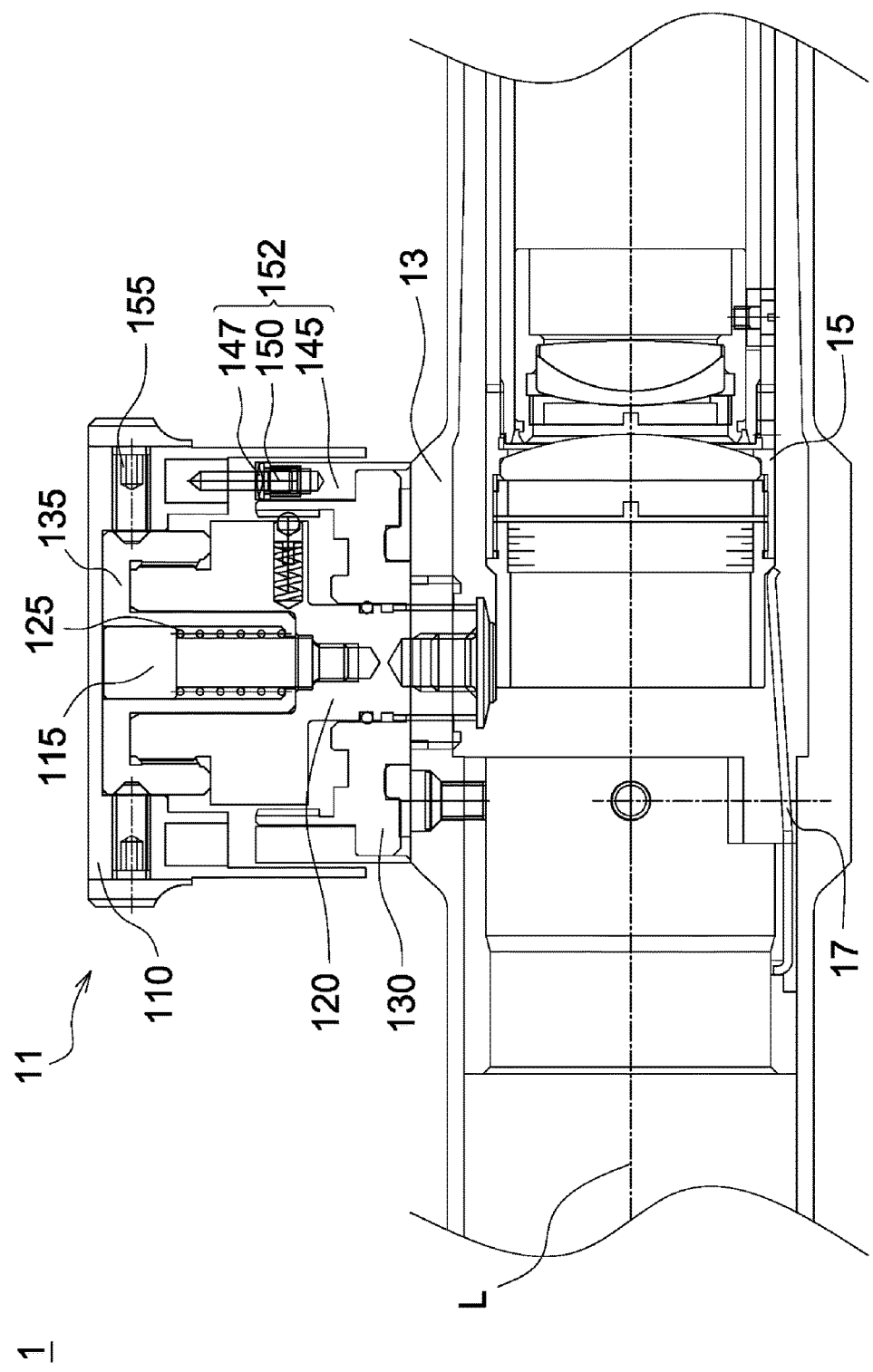
FIG. 1 is a side sectional view of a sight and compensating mechanism thereof in accordance with a first embodiment of the invention.
Figure 2:
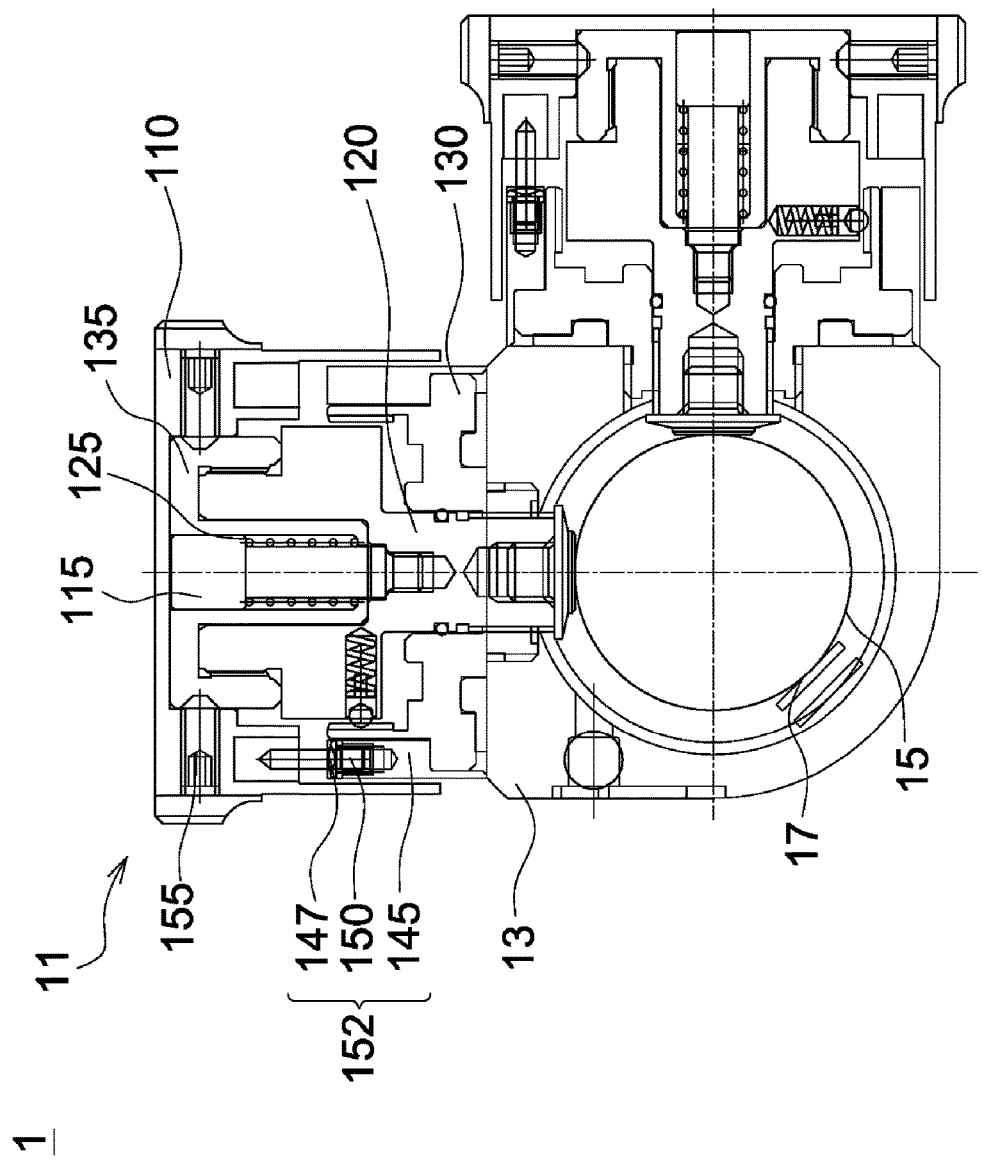
FIG. 2 is a front sectional view of the sight and compensating mechanism thereof in accordance with the first embodiment of the invention.

Referring to FIGS. 1 and 2, a sight 1 in accordance with a first embodiment of the invention includes a main body 13, a compensating mechanism 11, an objective unit (not shown), an ocular unit (not shown), an inner lens barrel 15 and an elastic element 17, and the compensating mechanism 11 includes a base 130, an adjusting unit 120, an adjusting cap 110 and a stop unit 152. The objective unit, the inner lens barrel 15 and the ocular unit constitute an optical axis L. The compensating mechanism 11 is configured to adjust an angle of the optical axis L relative to a central axis of the main body 13. Further, the compensating mechanism 11 is provided with a "zero stop" function. When a user rotates the adjusting cap 110 through 360 degrees in a single direction, the adjusting cap 110 is constrained and stopped. Afterwards, the user is able to rotate the adjusting cap 110 in a reverse direction of the single direction until the adjusting cap 110 is stopped and returns to a zero-point position. Moreover, the user is capable of switching the adjusting cap 110 between different positions for releasing the adjusting cap 110 from constraint after a full rotation (360 degrees).

The main body 13 has a front end portion (not shown) and a rear end portion (not shown). The objective unit is connected to the front end portion, and the ocular unit is connected to the rear end portion. As shown in FIGS. 1 and 2, the inner lens barrel 15 is disposed within the main body 13 and between the objective unit and the ocular unit and includes a plurality of lenses (not shown). The elastic element 17 is disposed on inner circumferential surfaces of the main body 13 and against the inner lens barrel 15. The compensating mechanism 11 is disposed on the main body 13 and penetrates into the main body 13 and against outer circumferential surfaces of the inner lens barrel 15 so as to adjust the optical axis L.

The base 130 is disposed on the main body 13 and has inner threads (not shown). The adjusting unit 120 is mated with the base 130 by the inner threads and penetrates into the main body 13 and against the outer circumferential surfaces of the inner lens barrel 15. The compensating mechanism 11 further includes a limiting bolt 115, an elastic element 125 and a connecting element 135. The limiting bolt 115 penetrates through the elastic element 125 and the connecting element 135 and is fixed to the adjusting unit 120. Therefore, the elastic element 125 is compressed between the limiting bolt 115 and the connecting element and generates a restoring force. One end of the elastic element 125 is disposed against a flange portion of the limiting bolt 115, and the other end of the elastic element 125 is disposed against a bottom portion of the connecting element 135. The connecting element 135 is forced against the adjusting unit 120 by the restoring force. In another embodiment, the adjusting unit is an adjusting element having a polygonal profile, and the above inner threads are replaced with a polygonal hole corresponding to the adjusting element so that the adjusting element can be fitted to the base. In yet another embodiment, the limiting bolt is a limiting member having a polygonal profile, and the adjusting unit has a polygonal hole corresponding to the limiting member so that the limiting member can be connected to the adjusting element.

Figure 3:
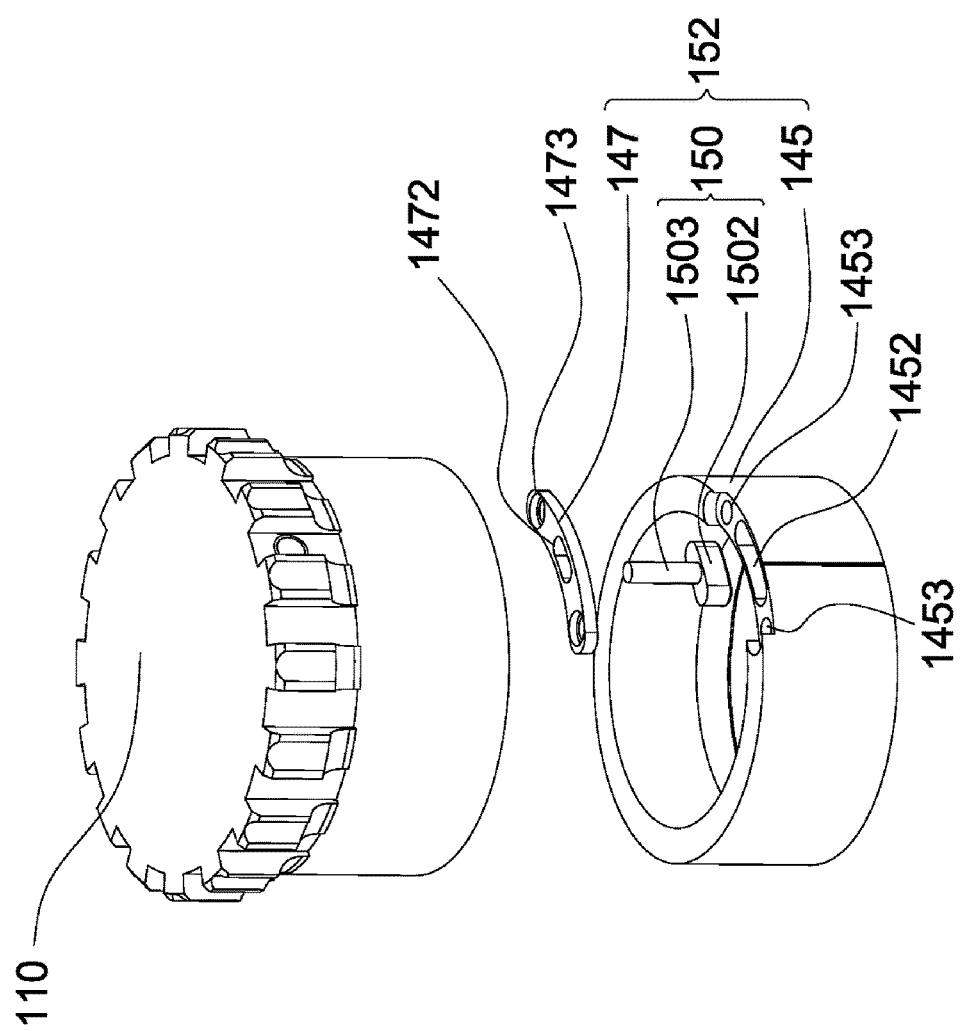
FIG. 3 is an exploded view of an adjusting cap and a stop unit of the compensating mechanism in accordance with the first embodiment of the invention.
Figure 4:
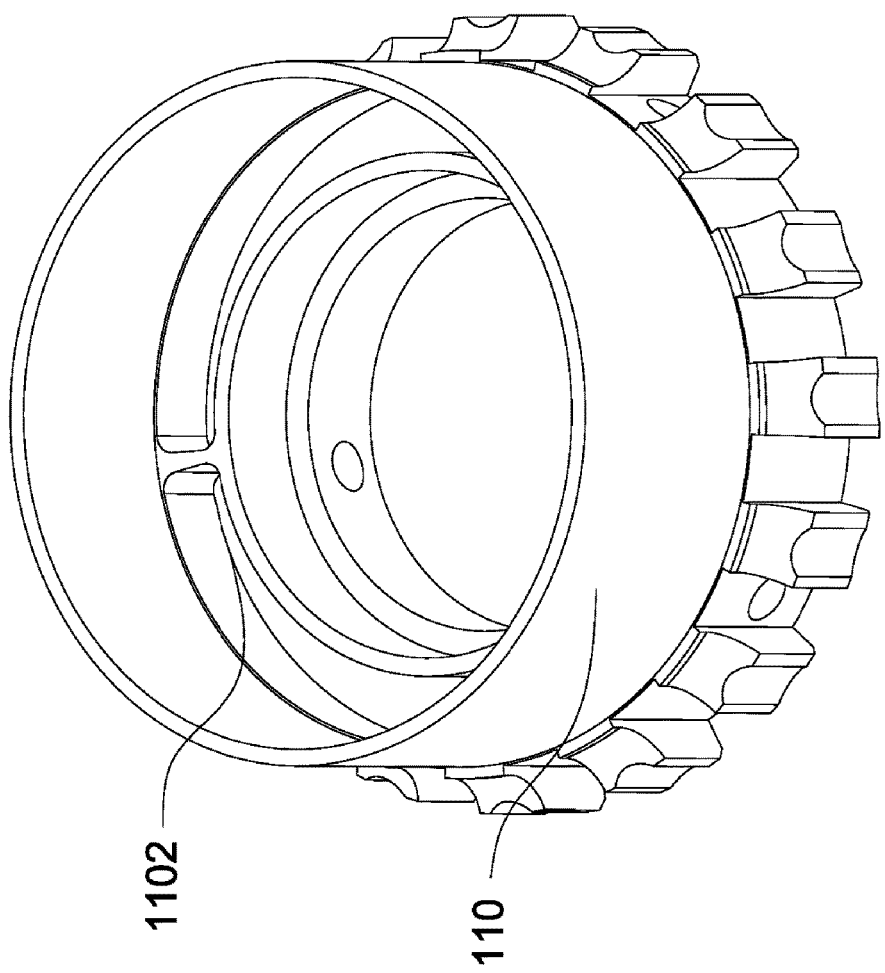
FIG. 4 is a schematic view of the adjusting cap of the FIG. 3, showing the interior thereof.

Referring to FIG. 3, the stop unit 152 includes a stop ring 145, a sliding element 150 and a limiting element 147. The stop ring 145 is disposed around the base 130 and is provided with a sliding slot 1452 and two threaded holes 1453. The limiting element 147 includes a limiting slot 1472 (or a limiting portion) and two through holes 1473. The sliding element 150 includes a base portion 1502 and a pin portion 1503, the base portion 1502 is movably disposed in the sliding slot 1452, and the pin portion 1503 movably penetrates through the limiting slot 1472. The stop unit 152 is further provided with two fixing screws (not shown). The fixing screws respectively penetrate through the through holes 1473 and are inserted into the threaded holes 1453 so that the stop ring 145, the sliding element 150 and the limiting element 147 are assembled to be a single piece. The sliding element 150 is configured to move in a circumferential direction of the stop ring 145 within a fixed distance (or along the limiting slot 1472). Referring to FIG. 4, the adjusting cap 110 is provided with a gap 1102 in a position corresponding to the stop ring 145. As shown in FIGS. 1 and 2, the compensating mechanism 11 further includes three fixing bolts 155, and the fixing bolts 155 penetrate through the adjusting cap 110 and against the connecting element 135 for connecting the adjusting cap 110 to the connecting element 135.

It is worth noting that the elastic element 125 is compressed in an amount of compression and generates the restoring force so that the adjusting cap 110 is generally forced by the restoring force to stay in a first position (as shown in FIGS. 1 and 2). When the adjusting cap 110 stays in the first position, the adjusting cap 110, the connecting element 135 and the adjusting unit 120 are linked and the pin portion 1503 penetrates into the gap 1102. Therefore, when the adjusting cap 110 is rotated, the adjusting cap 110 is able to rotate and move the adjusting unit 120 with respect to the base 130. Meanwhile, the pin portion 1503 is moved in the gap 1102 in a circumferential direction of the stop ring 145. However, when the adjusting cap 110 is pulled up by a force greater than the restoring force, the connecting element 135 is simultaneously pulled up and the elastic element 125 is further compressed. The adjusting cap 110 is allowed to move until the amount of compression reaches a predetermined value and is stopped in a second position (not shown). When the adjusting cap 110 stays in the second position, the adjusting cap 110, the connecting element 135 and the adjusting unit 120 are not linked and the pin portion 1503 is outside the gap 1102. In the first embodiment, the predetermined value is a maximal amount of compression of the elastic element 125. In another embodiment, the predetermined value is smaller than the maximal amount of compression of the elastic element 125. That is, the compensating mechanism 11 is allowed to operate as above description, even if the amount of compression of the elastic element 125 is smaller than the maximal amount.

In the first embodiment, the compensating mechanism 11 is an elevation compensating mechanism or a windage compensating mechanism, wherein the elevation compensating mechanism is usually disposed on a top side of the main body 13, and the windage compensating mechanism is usually disposed on a left or a right side of the main body 13.

Figure 5A:
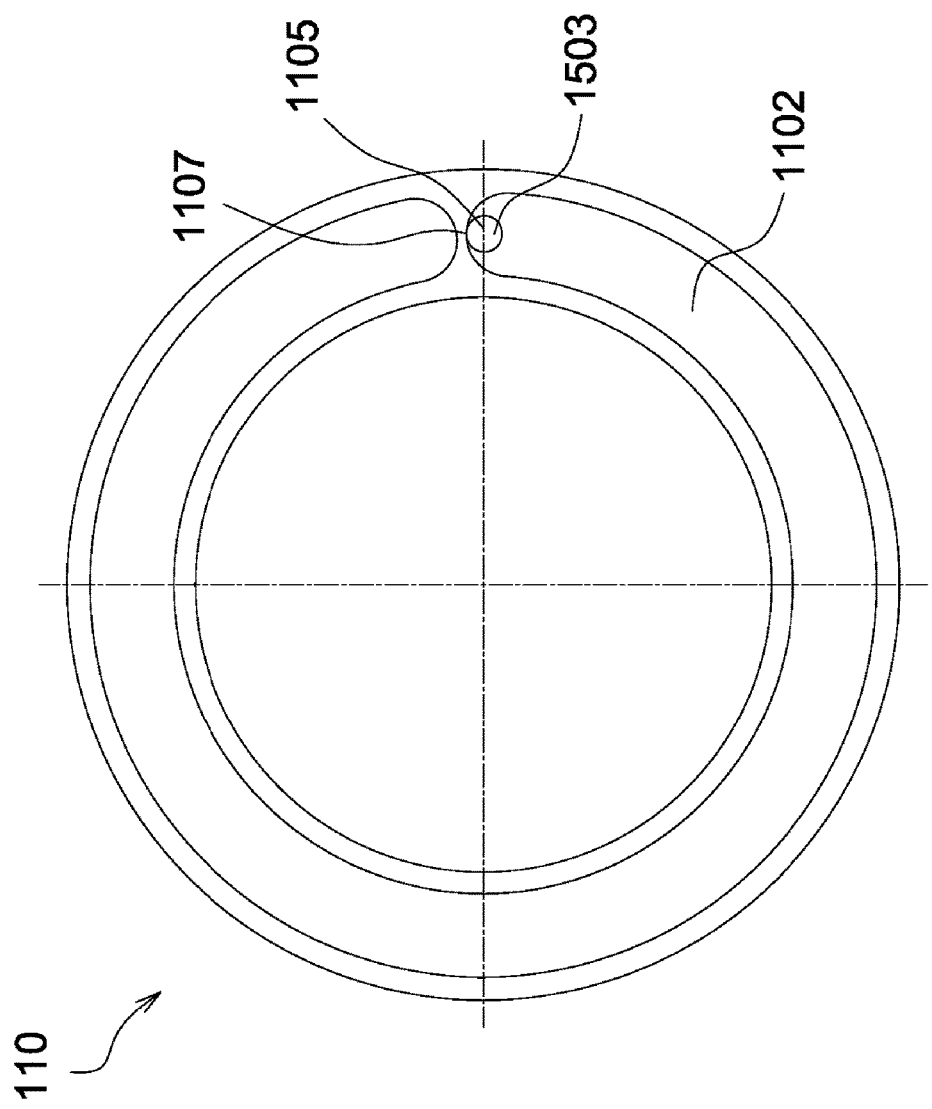
FIG. 5A is a schematic view of a pin portion of the FIG. 3 disposed in a gap of the adjusting cap.
Figure 5B:
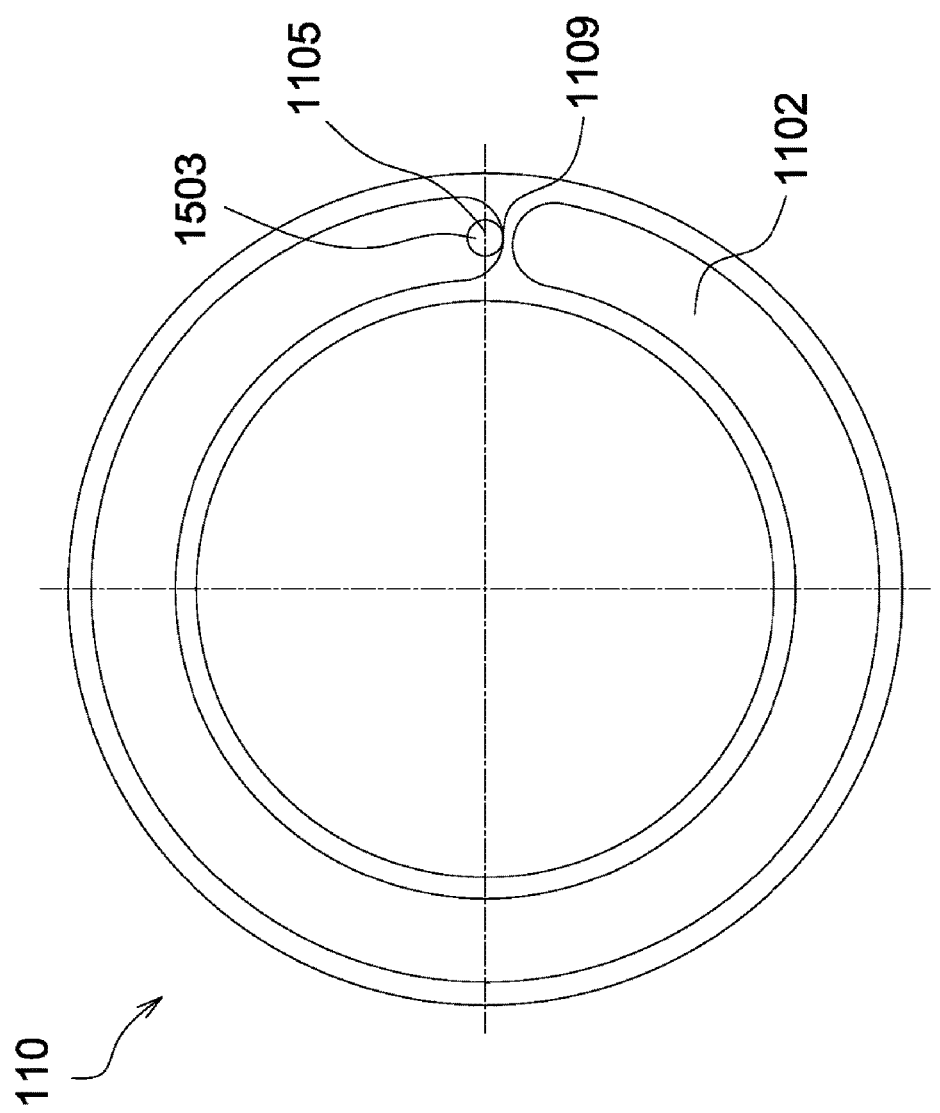
FIG. 5B is another schematic view of the pin portion of the FIG. 3 disposed in the gap of the adjusting cap.
Figure 5C:
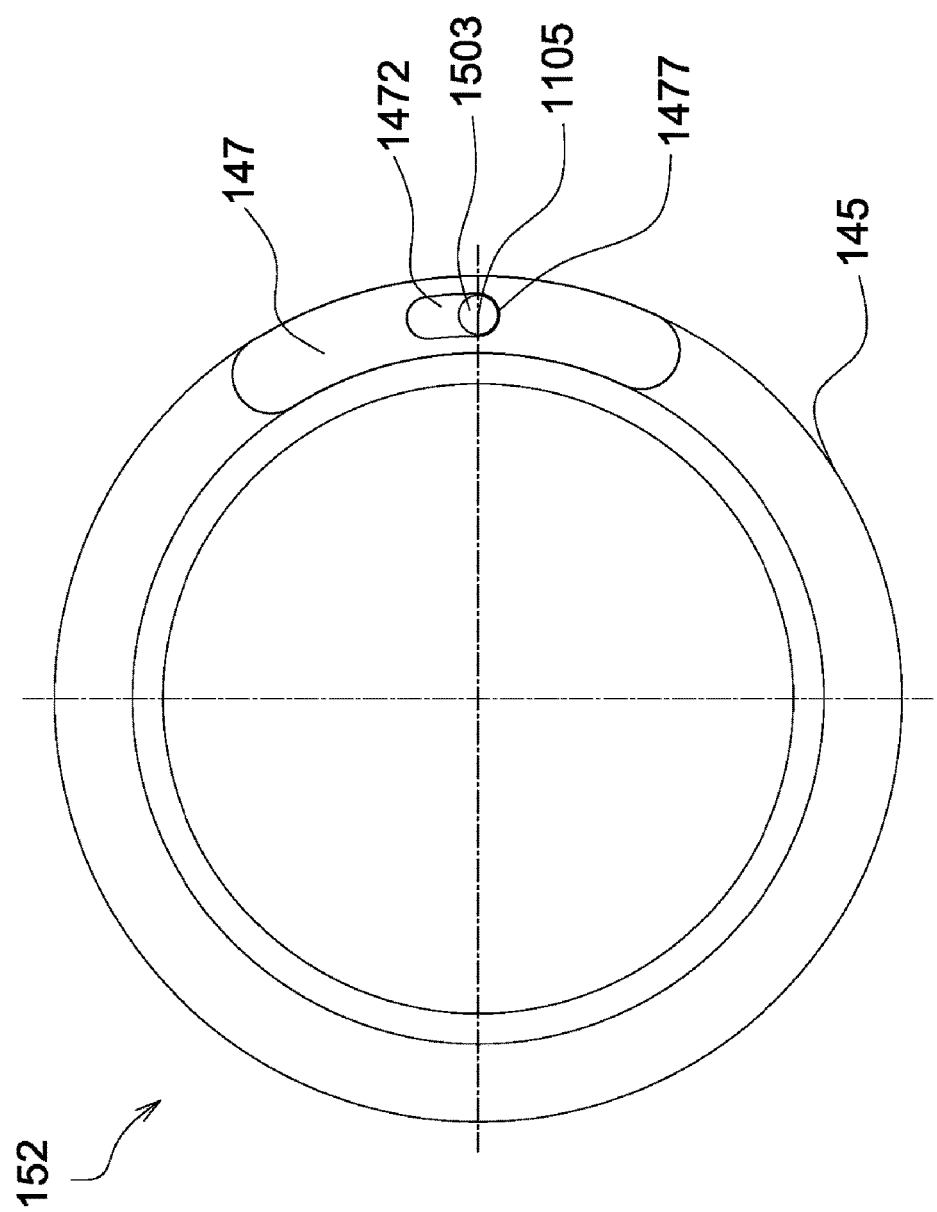
FIG. 5C is a schematic view of the pin portion of the FIG. 3 disposed in a limiting slot of a limiting element.

Before bullet impact points are corrected, setting the zero point for the compensating mechanism 11 is required wherein the zero point is set by adjusting the adjusting unit 120 to be in a reference position and adjusting the adjusting cap 110 to be in a zero-point position. Referring to FIGS. 5A, 5C and 5D, when the adjusting cap 110 is placed in the zero-point position, the pin portion 1503 is placed in an initial position 1105 and against a first end 1107 of the gap 1102 as well as a third end 1477 of the limiting slot 1472, and the base portion 1502 is placed against a fifth end 1508 of the sliding slot 1452.

Figure 6A:
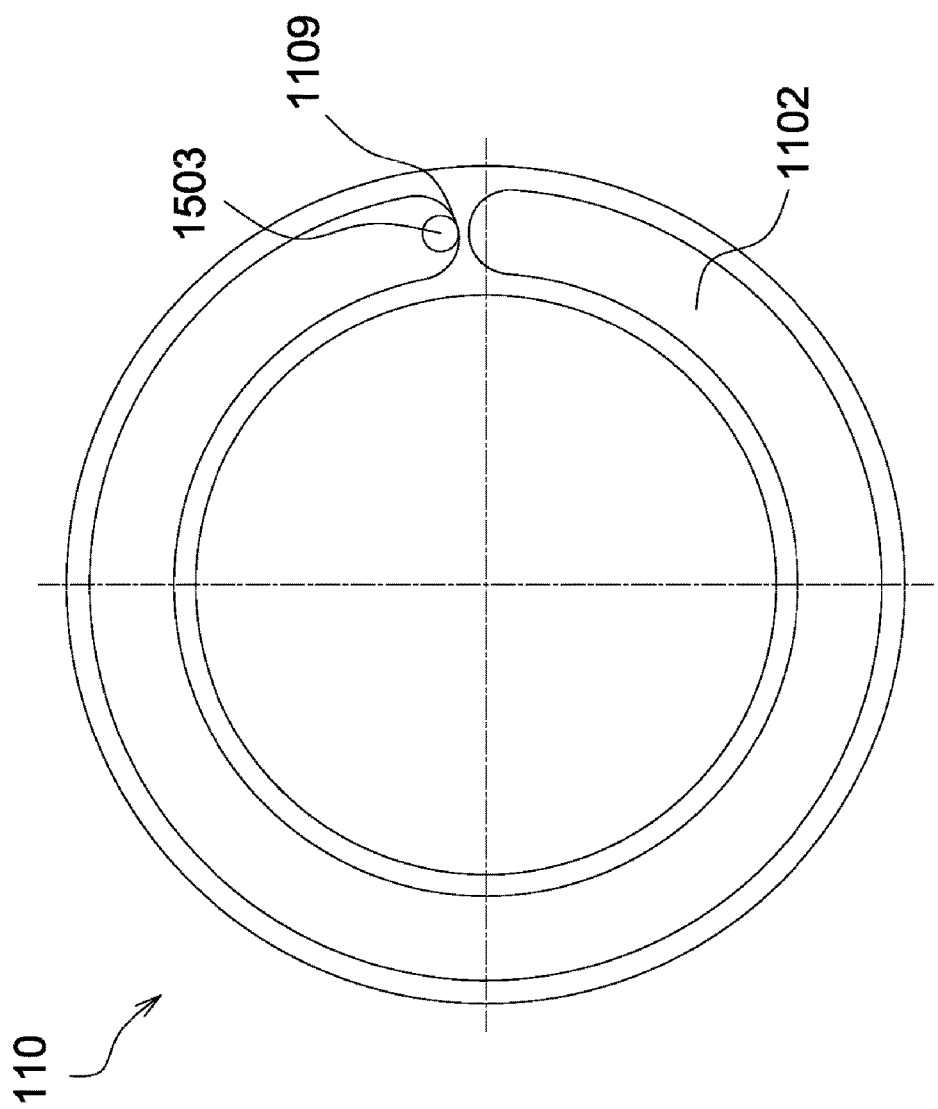
FIG. 6A is another schematic view of the pin portion of the FIG. 3 disposed in the gap of the adjusting cap.
Figure 6B:
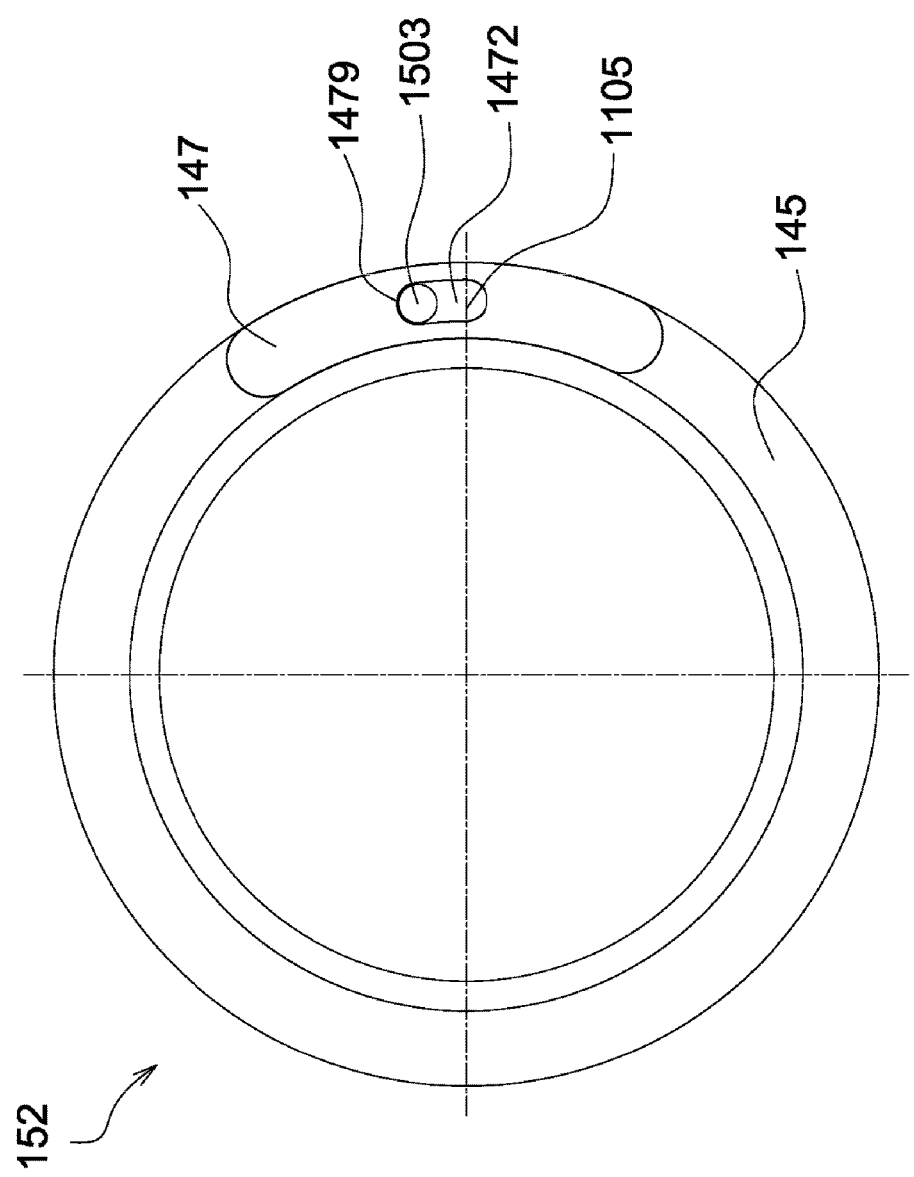
FIG. 6B is another schematic view of the pin portion of the FIG. 3 disposed in the limiting slot of the limiting element.
Figure 6C:
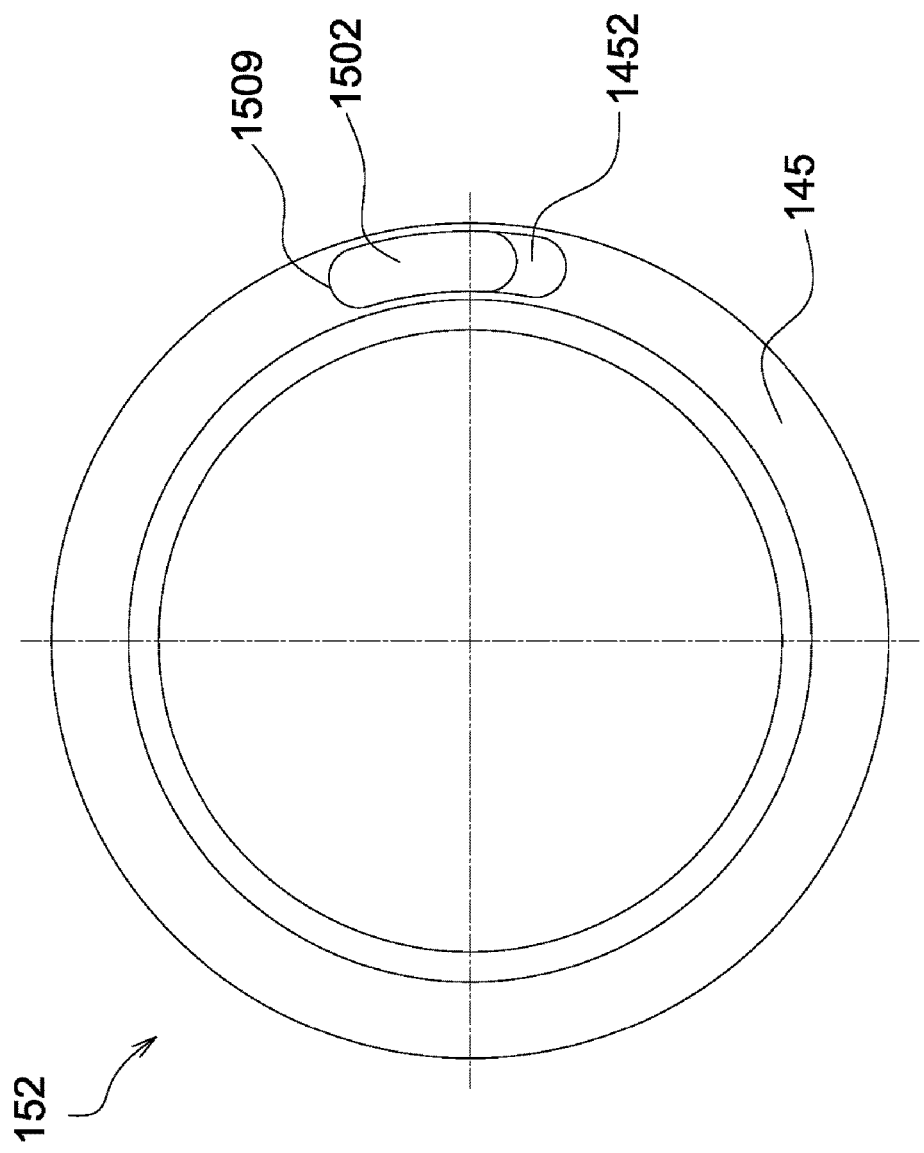
FIG. 6C is another schematic view of the base portion of the FIG. 3 disposed in the sliding slot of the stop ring.

In the beginning of operation of the compensating mechanism 11, the adjusting cap 110 is constrained by the stop unit 152 and can only be rotated in a single direction (e.g. in a clockwise or a counterclockwise direction). However, after the pin portion 1503 is moved away from the first end 1107, the constraint on the rotational direction of the adjusting cap 110 (i.e. in the single direction) is removed. During rotation of the adjusting cap 110 in the single direction, the pin portion 1503 is moved from the first end 1107 to a second end 1109 in the gap 1102. Referring to FIGS. 5B, 5C and 5D, when the pin portion 1503 is moved to push against the second end 1109 of the gap 1102 as well as the third end 1477 of the limiting slot 1472 and the base portion 1502 is still placed against the fifth end 1508 of the sliding slot 1452, the adjusting cap 110 is only rotated through an angle less than 360 degrees relative to the zero-point position. A full rotation (360 degrees) of the adjusting cap 110 can be completed by further rotating the adjusting cap 110 so that the second end 1109 of the gap 1102 forces the pin portion 1503 to move from the third end 1477 to a fourth end 1479 in the limiting slot 1472. Meanwhile, the base portion 1502 is moved from the fifth end 1508 to a sixth end 1509 in the sliding slot 1452. Referring to FIGS. 6A-6C, when the pin portion 1503 is moved to push against the second end 1109 of the gap 1102 as well as the fourth end 1479 of the limiting slot 1472 and the base portion 1502 is moved to push against the sixth end 1509 of the sliding slot 1452, the adjusting cap 110 is rotated through 360 degrees relative to the zero-point position and is unable to be further rotated in the single direction.

During the rotation of the adjusting cap 110, it is understood that the adjusting unit 120 is moved in an axial direction of the base 130 for pushing the inner lens barrel 15 so as to adjust the angle of the optical axis L relative to the central axis of the main body 13.

During above described operation, if adjusting the compensating mechanism 11 back to the zero-point-set state is desired, then the adjusting cap 110 is rotated in a reverse direction of the single direction until rotation of the adjusting cap 110 is blocked. When the pin portion 1503 is moved to push against the first end 1107 of the gap 1102 and the third end 1477 of the limiting slot 1472, the adjusting cap 110 is stopped in the zero-point position and is unable to be rotated in the reverse direction of the single direction, and the adjusting unit 120 is stopped in the reference position.

As above description, rotation of the adjusting cap 110 is constrained. That is, the adjusting cap 110 is blocked from rotating after a full rotation. If correcting bullet impact points is not completed yet, then the adjusting cap 110 can be pulled up to stop in the second position so that the adjusting cap 110, the connecting element 135 and the adjusting unit 120 are not linked and the pin portion 1503 is outside the gap 1102. Then, the adjusting cap 110 is rotated until the pin portion 1503 is placed in a position where the pin portion 1503 can push against the first end 1107 of the gap 1102 if the adjusting cap 110 returns to the first position. Then, the adjusting cap 110 is released so that the adjusting cap 110 returns to the first position by the restoring force of the elastic element 125, the adjusting cap 110, the connecting element 135 and the adjusting unit 120 are linked again, and the pin portion 1503 is placed against the first end 1107 of the gap 1102. Thus, the user can continue to rotate the adjusting cap 110 in the single direction for completion of correcting bullet impact points.

Figure 7A:
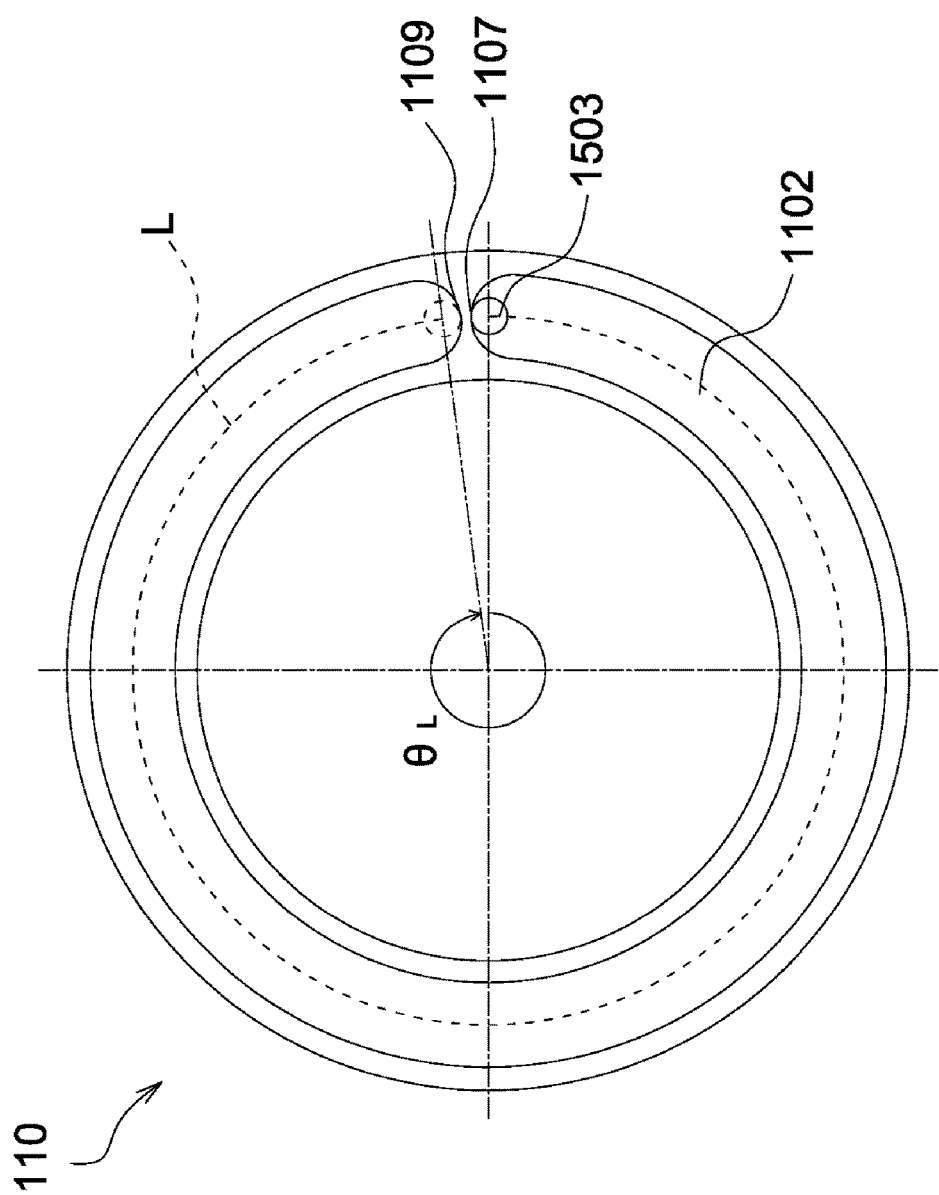
FIG. 7A is a schematic view showing a curved path along which the pin portion of the FIG. 3 moves in the gap and a central angle corresponding to the curved path.
Figure 7B:
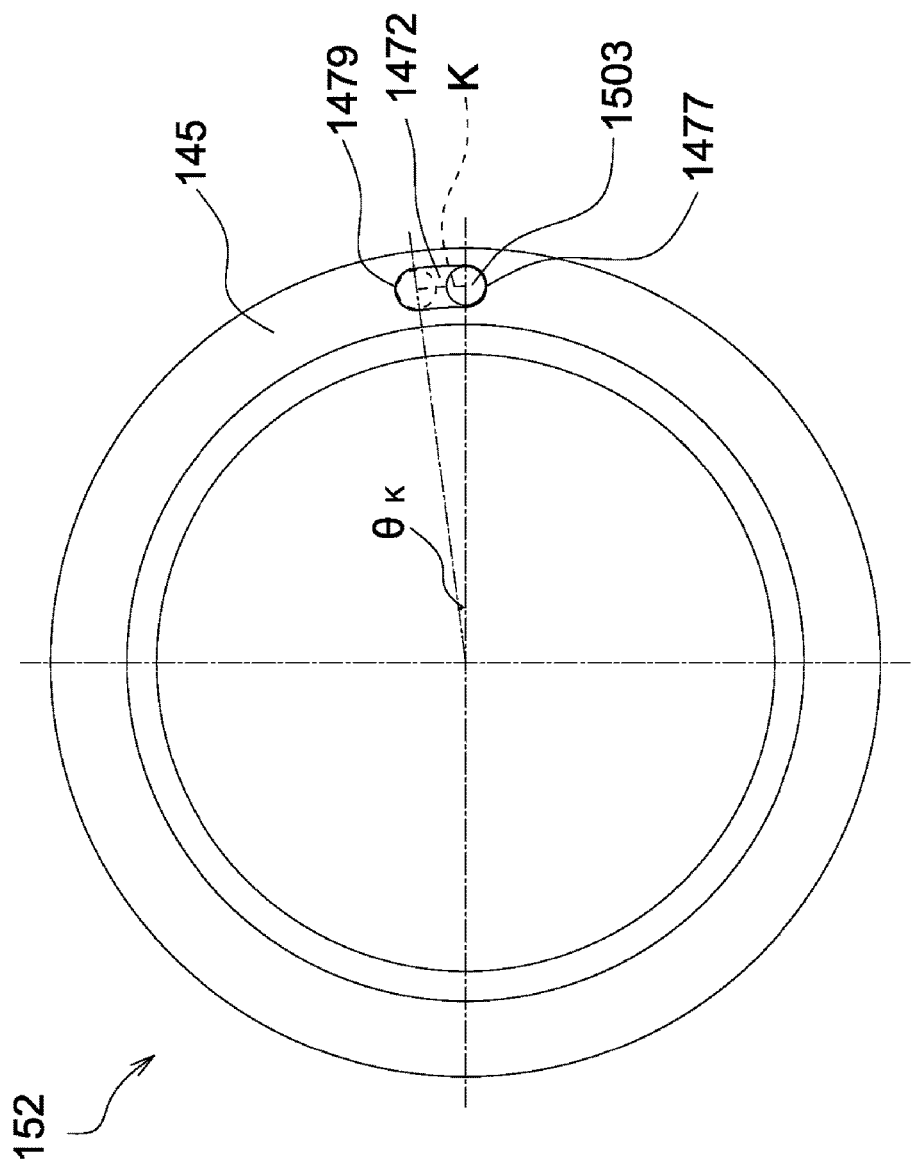
FIG. 7B is a schematic view showing a curved path along which the pin portion of the FIG. 3 moves in the limiting slot and a central angle corresponding to the curved path.

Referring to FIGS. 7A and 7B, when the pin portion 1503 is moved from the first end 1107 to the second end 1109 in the gap 1102 along a first curved path L, the first curved path L corresponds to a first central angle $\theta_L$. That is, the adjusting cap 110 is rotated in the single direction through the first central angle $\theta_L$ relative to the zero-point position. Moreover, the pin portion 1503 is pushed from the third end 1477 to the fourth end 1479 in the limiting slot 1472 along a second curved path K, and the second curved path K corresponds to a second central angle $\theta_K$. As a result, the adjusting cap 110 is rotated in the single direction through the first central angle $\theta_L$ and the second central angle $\theta_K$ (full rotation) relative to the zero-point position, and a sum of the first central angle $\theta_L$ and the second central angle $\theta_K$ is 360 degrees.

Figure 8A:
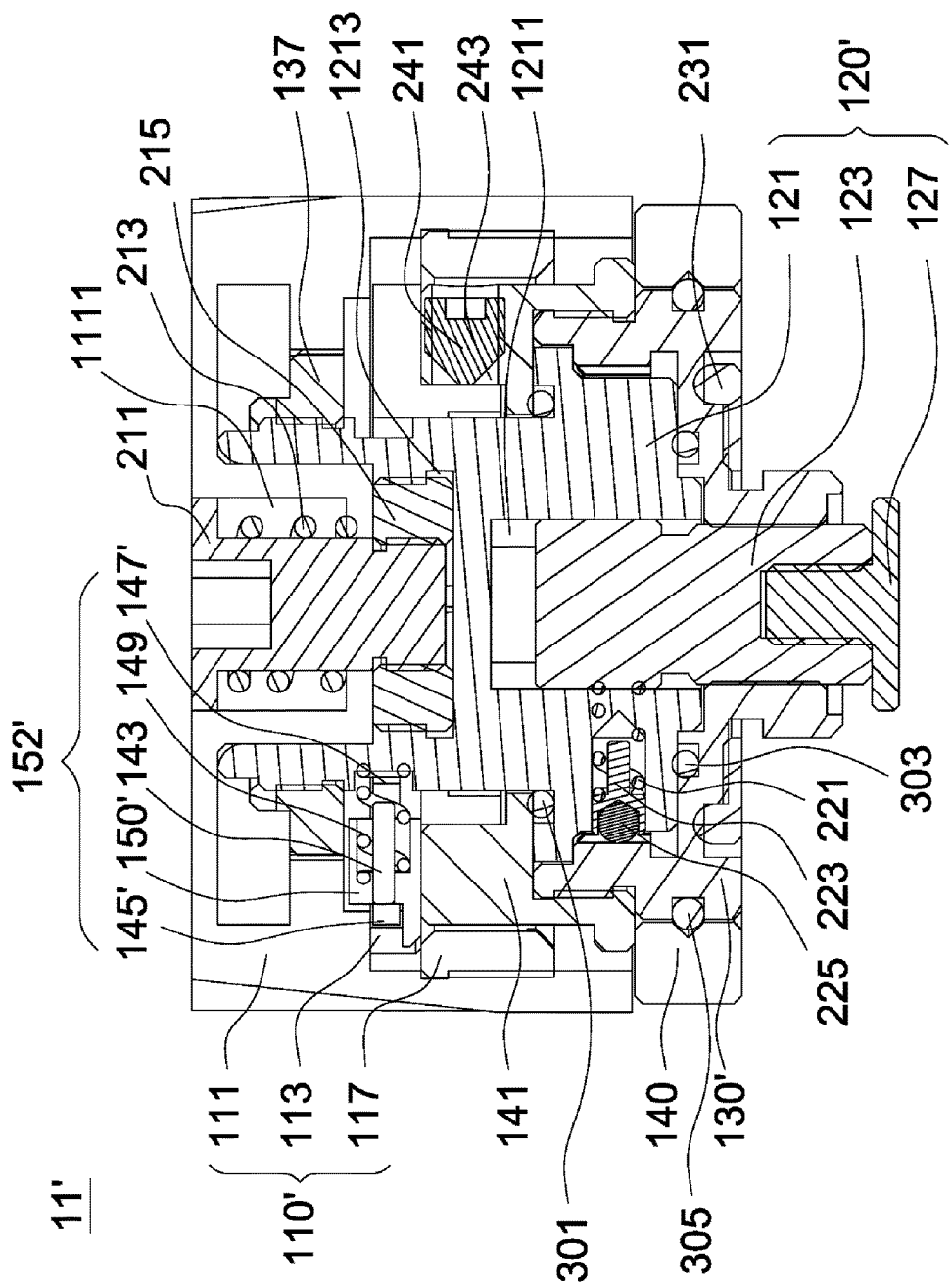
FIG. 8A is a schematic view of a compensating mechanism in accordance with a second embodiment of the invention, with an adjusting cap thereof staying in a first position.
Figure 8B:
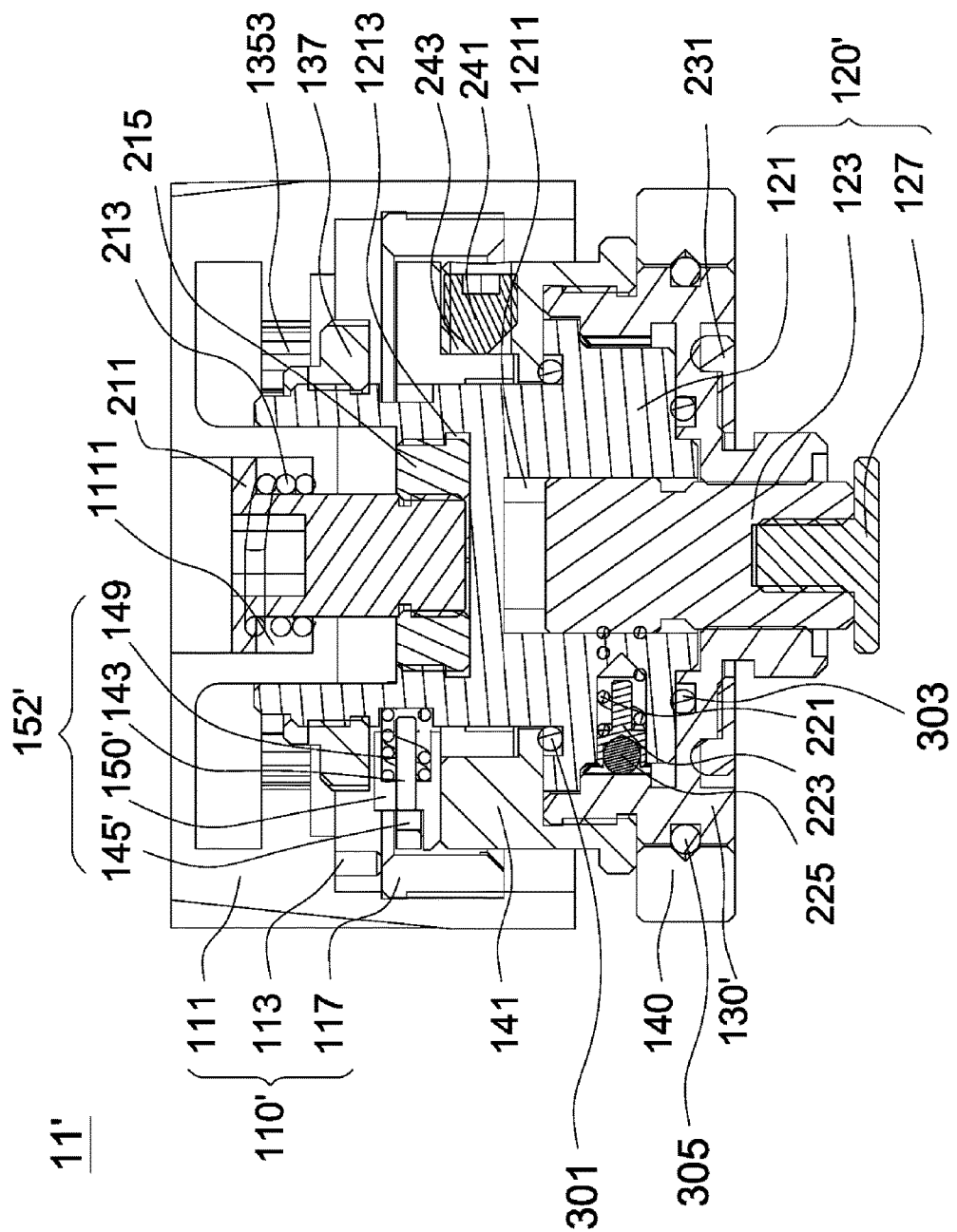
FIG. 8B is another schematic view of the compensating mechanism in accordance with the second embodiment of the invention, with the adjusting cap thereof staying in a second position.
Figure 9:
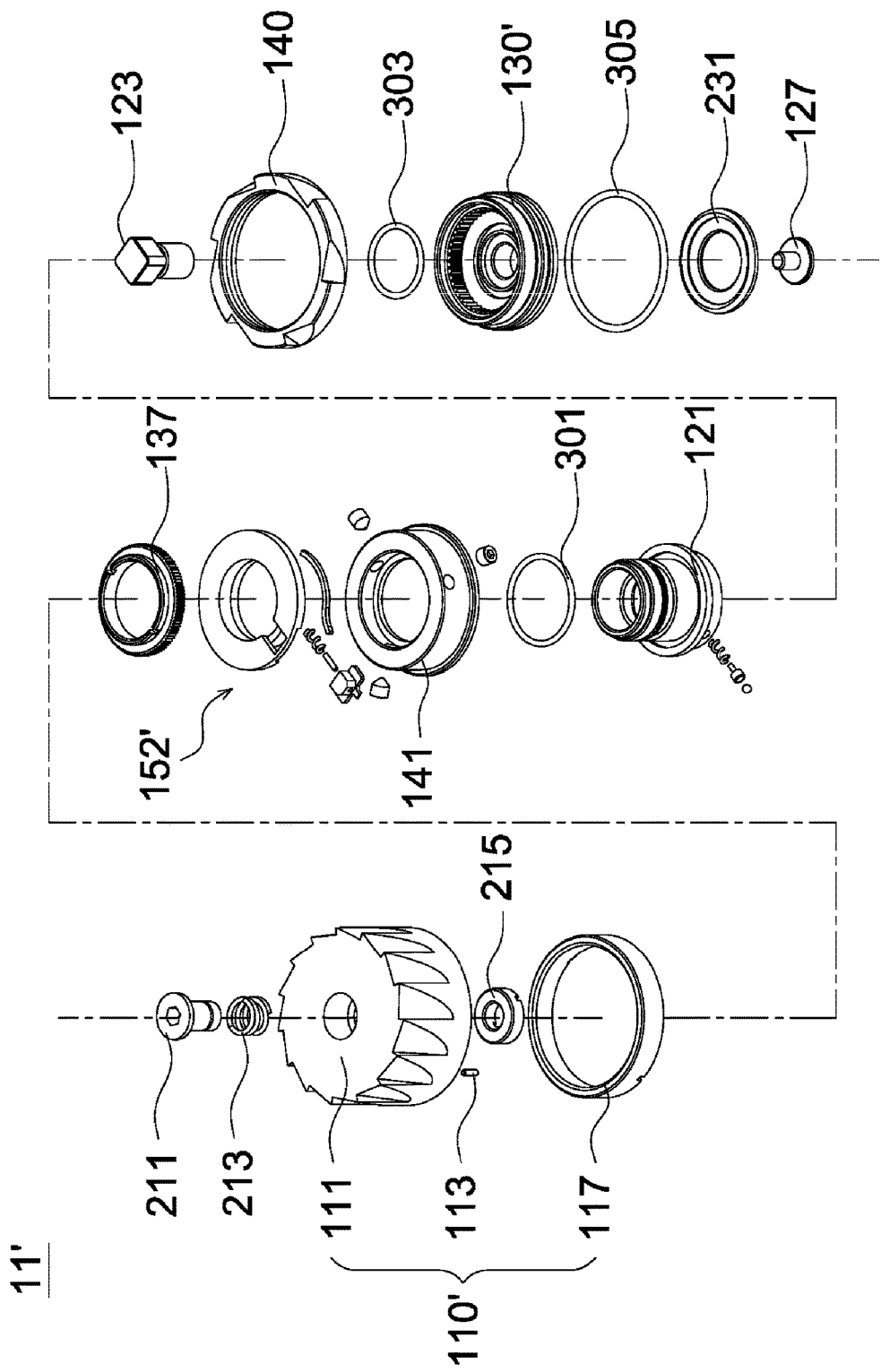
FIG. 9 is an exploded view of the compensating mechanism in accordance with the second embodiment of the invention.

Referring to FIGS. 8A, 8B and 9, a sight (not shown) in accordance with a second embodiment of the invention includes a main body (not shown), a compensating mechanism 11', an objective unit (not shown), an ocular unit (not shown), an inner lens barrel (not shown) and an elastic element (not shown), and the compensating mechanism 11' includes an adjusting cap 110', a gear ring 137, a stop unit 152', a bearing element 141, an adjusting unit 120', a counting element 140 and a base 130'. The objective unit, the inner lens barrel and the ocular unit constitute an optical axis (not shown). The compensating mechanism 11' is configured to adjust an angle of the optical axis relative to a central axis of the main body and has a "zero stop" function and a "zero reset" function. When a user rotates the adjusting cap 110' through 360 degrees in a single direction, the adjusting cap 110' is constrained and stopped from rotating. Afterwards, the user is able to rotate the adjusting cap 110' in a reverse direction of the single direction until the adjusting cap 110' is stopped and returns to a zero-point position. Moreover, the user is capable of switching the adjusting cap 110' between different positions for either releasing the adjusting cap 110' from constraint after a full rotation (360 degrees) or resetting the zero point for the compensating mechanism 11'.

The main body has a front end portion (not shown) and a rear end portion (not shown). The objective unit is connected to the front end portion, and the ocular unit is connected to the rear end portion. The inner lens barrel is disposed within the main body and between the objective unit and the ocular unit and includes a plurality of lenses (not shown). The elastic element is disposed on inner circumferential surfaces of the main body and against the inner lens barrel. The compensating mechanism 11' is disposed on the main body and penetrates into the main body and against outer circumferential surfaces of the inner lens barrel so as to adjust the optical axis.

Figure 10:
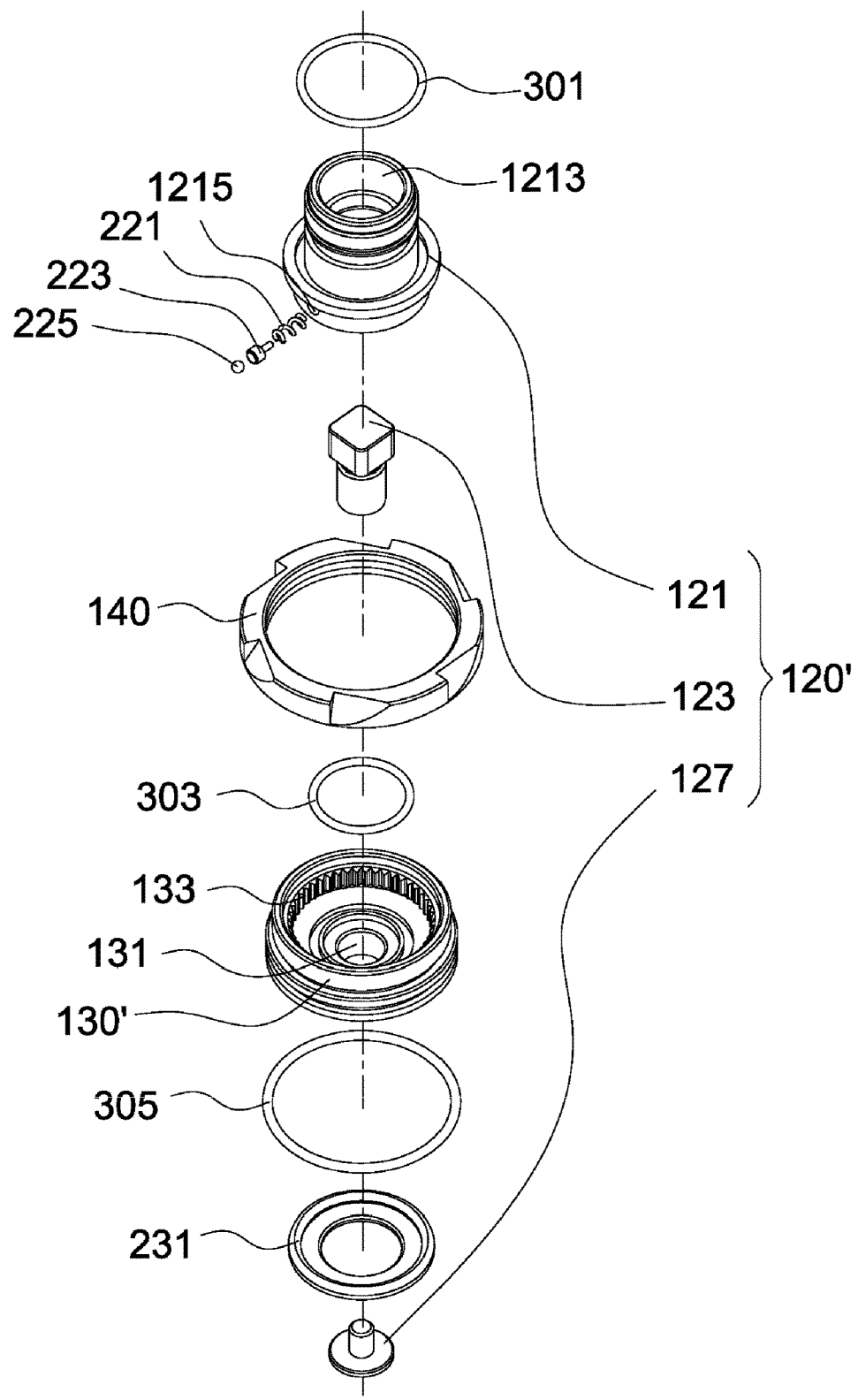
FIG. 10 is an exploded view of an adjusting unit and a base of the FIG. 9.

Referring to FIGS. 8A, 8B and 10, the base 130' is disposed on the main body by means of a rubber ring 231 and has an adjusting hole 131 and a plurality of axial indentations 133. The counting element 140 is disposed around the base 130', and an O-shaped ring 305 is clamped between the counting element 140 and the base 130'. After the compensating mechanism 11' is adjusted to a zero-point-set state, the counting element 140 is adjusted to a position representing that the adjusting cap 110' is not rotated yet. By such arrangement, the user is able to record the number of full rotation of the adjusting cap 110' in operation by adjusting the counting element 140 accordingly. The adjusting unit 120' is disposed on the base 130' and penetrates through the adjusting hole 131 and into the main body, and an o-shaped ring 303 is clamped between the adjusting unit 120' and the base 130'. Specifically, the adjusting unit 120' includes a transmitting element 121, a first screw 123 and a second screw 127. The transmitting element 121 has a first accommodating space 1211, a second accommodating space 1213 and a blind hole 1215. The transmitting element 121 is disposed on the base 130', and an o-shaped ring 301 is disposed around the transmitting element 121. The first screw 123 is disposed in the first accommodating space 1211 and penetrates through the adjusting hole 131. The second screw 127 is disposed on an end portion of first screw 123 and against the inner lens barrel, wherein the first screw 123 is provided with outer threads (not shown), and the outer threads are configured to engage with inner threads (not shown) on an inner cylindrical wall of the adjusting hole 131. In addition, an elastic element 221, a ball seat 223 and a ball member 225 are sequentially disposed in the blind hole 1215. The ball member 225 is disposed on the ball seat 223, and the ball seat 223 is forced by a restoring force generated by the elastic element 221 so as to push the ball member 225 against the indentations 133. The ball member 225 is moved between the indentations 133 for making clicking sounds when the transmitting element 121 is rotated.

Figure 11:
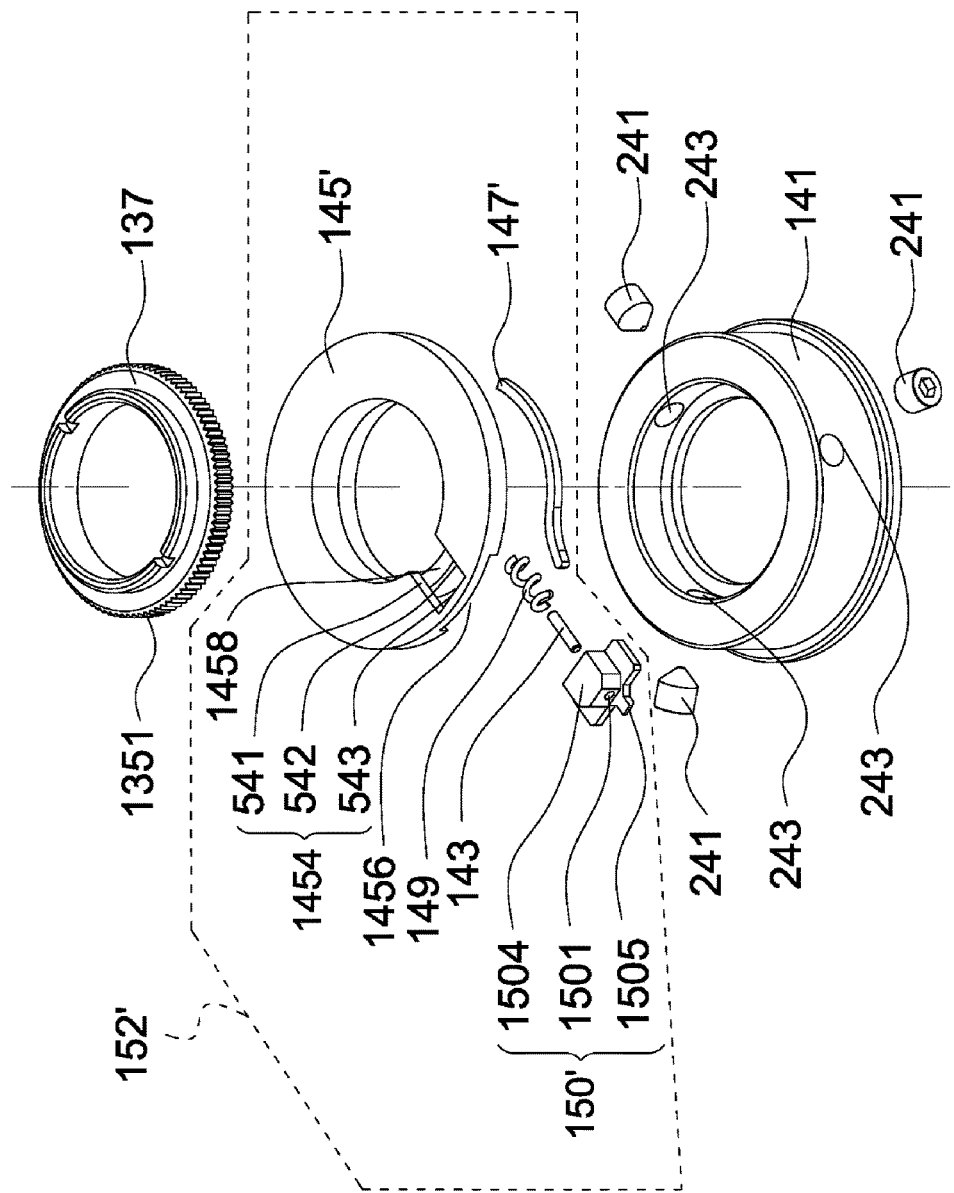
FIG. 11 is an exploded view of a connecting element, a stop unit and a bearing element of the FIG. 9.

Referring to FIGS. 8A, 8B and 11, the bearing element 141 is disposed on the base 130' and around the transmitting element 121 so that the o-shaped ring 301 is clamped between the bearing element 141 and the transmitting element 121. Moreover, the bearing element 141 is configured to bear the stop unit 152' so that the stop unit 152' is also disposed around the transmitting element 121. In the second embodiment, the bearing element 141 has three through holes 243, and the stop unit 152' includes a pin 143, a limiting element 145', a limiting member 147', an elastic element 149 and a sliding element 150'. The limiting element 145' is ring-shaped and has a sliding space 1458, a first opening portion 1454 (or a limiting portion) and a second opening portion 1456, wherein the first opening portion 1454 is defined by a first end portion 541, a second end portion 542 and an edge portion 543. The sliding element 150' has a through hole 1501, a sliding portion 1504 and a stop portion 1505.

Figure 12A:
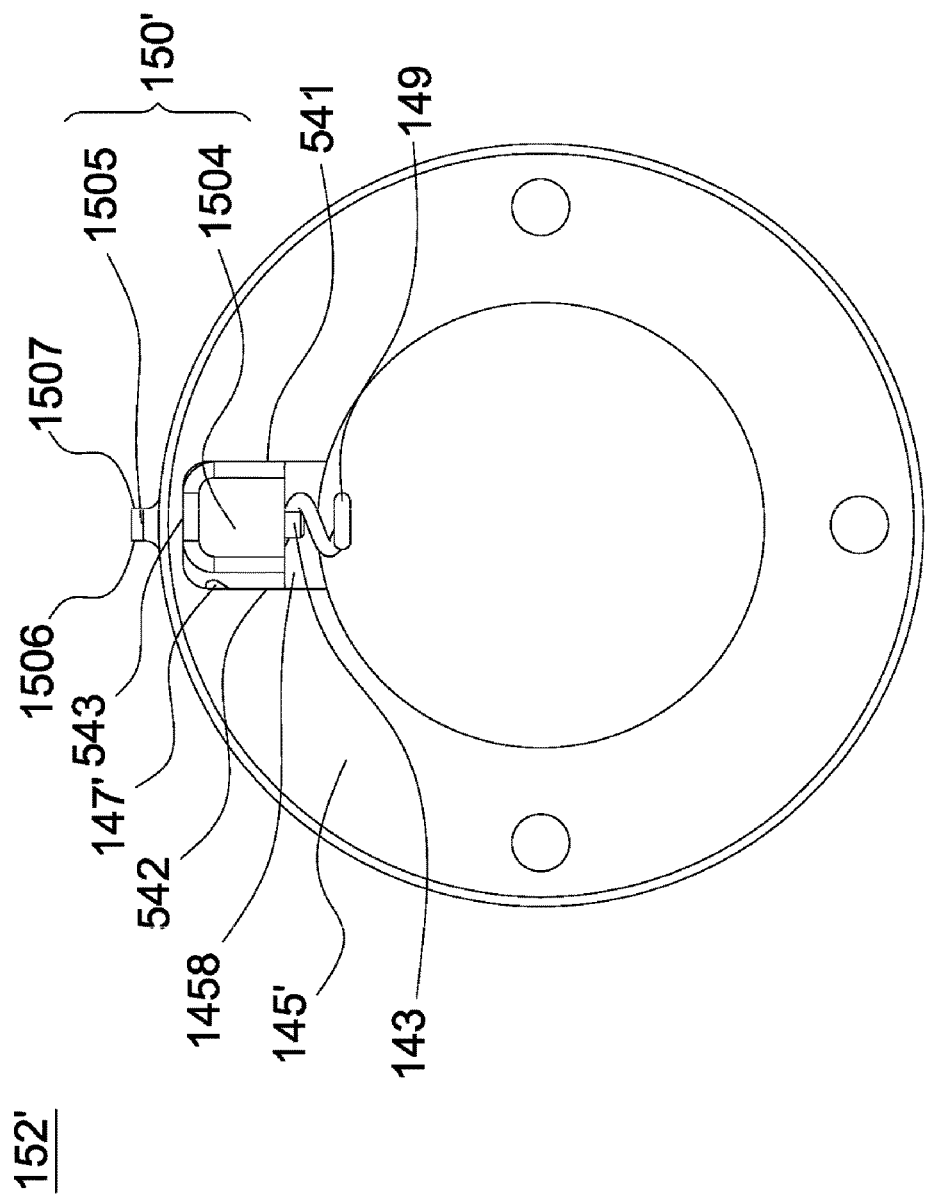
FIG. 12A is a top view of the stop unit of the FIG. 11.
Figure 12B:
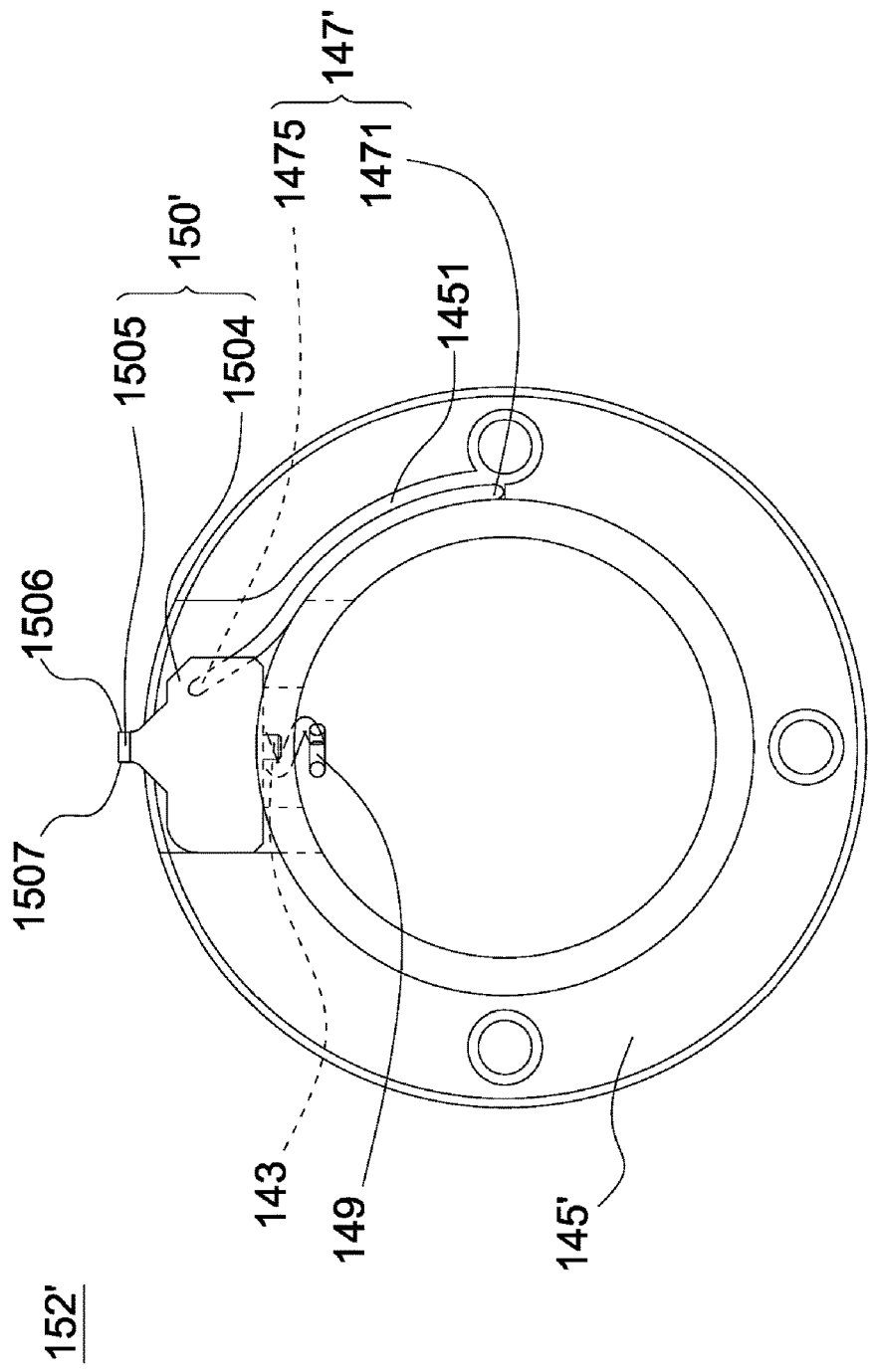
FIG. 12B is a bottom view of the stop unit of the FIG. 11.

Specifically, the limiting element 145' is disposed on the bearing element 141, and three fixing elements 241 respectively penetrate through the through holes 243 and against the limiting element 145' so as to fix the limiting element 145'. The pin 143 is disposed in the through hole 1501, and the elastic element 149 is disposed around the pin 143. Referring to FIGS. 12A and 12B, the sliding element 150' on which the pin 143 and the elastic element 149 are mounted is disposed in the sliding space 1458. The elastic element 149 has a first end and a second end, wherein the first end is placed against the sliding portion 1504, and the second end penetrates through the sliding space 1458 in a direction away from the second opening portion 1456 and against the transmitting element 121, so that the sliding portion 1504 is forced against the edge portion 543 by a restoring force generated by the elastic element 149. As shown in FIGS. 8A and 8B, when the pin 143, the elastic element 149 and the sliding element 150' are disposed in the sliding space 1458, the edge portion 543, the through hole 1501, the pin 143 and the elastic element 149 are at same altitude. Further, a part of the sliding portion 1504 higher than the through hole 1501 is placed to penetrate through the first opening portion 1454 and out of the sliding space 1458. It is worth noting that the stop portion 1505 penetrates through the second opening portion 1456 and out of the sliding space 1458 when the sliding portion 1504 is forced against the edge portion 543. When the sliding element 150' is forced to move the sliding portion 1504 away from the edge portion 543, the elastic element 149 is further compressed and the stop portion 1505 is moved into the sliding space 1458.

As shown in FIG. 12B, the limiting member 147' has a first end 1471 and a second end 1475, wherein the first end 1471 is fixed in a fixing groove 1451 of the limiting element 145', and the second end 1475 is placed against the sliding portion 1504. After the stop unit 152' is mounted, the limiting member 147' is deformed and generates a restoring force, and the second end 1475 pushes the sliding portion 1504 by the restoring force so that the sliding portion 1504 is forced against the first end portion 541. If the sliding element 150' is pushed by an external force greater than the restoring force, then the limiting member 147' is further deformed, and the sliding portion 1504 is moved away from the first end portion 541 to the second end portion 542 and stays against the second end portion 542. It understood that the sliding portion 1504 will be forced against the first end portion 541 by the second end 1475 again if the external force is removed.

Referring to FIGS. 8A, 8B, 11 and 13, the gear ring 137 is disposed around the transmitting element 121 and has a plurality of first axial indentations 1351. The adjusting cap 110' includes a cap body 111, an abutting element 113 and a junk ring 117. The cap body 111 has a limiting hole 1111 and a plurality of second axial indentations 1353 (as shown in FIG. 8B), and the second indentations 1353 are configured to engage with the first indentations 1351 so that the adjusting cap 110' can move the adjusting unit 120' with respect to the base 130'. The abutting element 113 is disposed on an interior side of the cap body 111, and the junk ring 117 is disposed on an inner cylindrical wall of the cap body 111. After the adjusting cap 110' is mounted, a junk ring 215 is disposed in the second accommodating space 1213, an elastic element 213 is disposed in the limiting hole 1111, and a limiting screw 211 sequentially penetrates through the elastic element 213 and the cap body 111 and is fixed to the junk ring 215, so that the adjusting cap 110' is connected to the adjusting unit 120'.

The elastic element 213 is compressed in the limiting hole 1111 in an amount of compression thereby generating a restoring force. In a general condition, the adjusting cap 110' is forced against the junk ring 215 by the restoring force and is stopped in a first position (as shown in FIG. 8A). When the adjusting cap 110' is stopped in the first position, the second indentations 1353 are engaged with the first indentations 1351, and the abutting element 113 is at same altitude as the stop unit 152'. However, when the adjusting cap 110' is pulled up by an external force greater than the restoring force to move away from the junk ring 215, the elastic element 213 is further compressed. The amount of compression of the elastic element 213 depends on the magnitude of the external force. The greater the external force is, the shorter the elastic element 213 is (or the greater the amount of compression of the elastic element 213 is). Therefore, the elastic element 213, without any external force applied thereto and elastic fatigue, will have a maximal length and a minimal amount of compression. The adjusting cap 110' is moved until the amount of compression of the elastic element 213 reaches a predetermined value and is stopped in a second position (as shown in FIG. 8B). In the second embodiment, the predetermined value is a maximal amount of compression of the elastic element 213. In other words, variation of the amount of compression of the elastic element 213 (or length of the elastic element 213) induced by the external force is equivalent to variation of the amount of compression of the elastic element 213 (or length of the elastic element 213) induced by movement of the adjusting cap 110' to the first position or the second position. When the adjusting cap 110' is pulled up and stopped in the second position, the second indentations 1353 are not engaged with the first indentations 1351, the abutting element 113 is higher than the stop unit 152', and the sliding element 150' is pushed by the junk ring 117 so that the stop portion 1505 is moved into the sliding space 1458. In another embodiment, the predetermined value is smaller than the maximal amount of compression of the elastic element 213. That is, the compensating mechanism 11' is capable of operating as above description, even if the amount of compression of the elastic element 213 is smaller than the maximal amount.

The ball member 225 described in the above embodiments of the invention may be a steel ball, the elastic element 149, 213 or 221 described in the above embodiments of the invention may be a spring, and the abutting element 113 may be a pin. The compensating mechanism 11' may be an elevation compensating mechanism or a windage compensating mechanism, wherein the elevation compensating mechanism is usually disposed on a top side of the main body, and the windage compensating mechanism is usually disposed on a left or a right side of the main body.

During the operation described below, the second indentations 1353 are engaged with the first indentations 1531 when the adjusting cap 110' is stopped in the first position, and the second indentations 1353 are not engaged with the first indentations 1531 when the adjusting cap 110' is stopped in the second position. In other words, when the adjusting cap 110' is stopped in the first position, the adjusting cap 110' is configured to move the adjusting unit 120' with respect to the base 130' so as to axially move the first screw 123 relative to the base 130'. However, when the adjusting cap 110' is stopped in the second position, the adjusting cap 110' is not able to move the adjusting unit 120' or the first screw 123 with respect to the base 130'. Moreover, the adjusting cap 110' is able to circumferentially move the abutting element 113 no matter the adjusting cap 110' is stopped in the first position or the second position.

Before bullet impact points are corrected, setting a zero point for the compensating mechanism 11' is required wherein the zero point is set by adjusting the first screw 123 to be in a first reference position and adjusting the adjusting cap 110' to be in a zero-point position. As above description, the adjusting cap 110' is generally stopped in the first position (as shown in FIG. 8A) for placing the abutting element 113 at same altitude as the stop unit 152', so as to achieve the "zero stop" function of the compensating mechanism 11'. Therefore, when the adjusting cap 110' is stopped in the zero-point position, the abutting element 113 is placed against a first side 1506 of the stop portion 1505 (the first side 1506 is close to the limiting member 147'), and the sliding portion 1504 is placed against the edge portion 543 and the first end portion 541 (as shown in FIG. 12A). The compensating mechanism 11' can be operated in three ways (1), (2) and (3), described below:

(1) Correction of bullet impact points: In the beginning of operation, the adjusting cap 110' is constrained by the stop unit 152' to rotate in a single direction (e.g. in a clockwise or a counterclockwise direction). After the abutting element 113 is moved away from the first side 1506 of the stop portion 1505, the constraint on the rotational direction of adjusting cap 110' (i.e. in the single direction) is removed. When the abutting element 113 is moved to push against a second side 1507 of the stop portion 1505 (the second side 1507 is far from the limiting member 147') and the sliding portion 1504 is still placed against the first end portion 541, the adjusting cap 110' is only rotated through an angle less than 360 degrees (e.g. 352.5 degrees) relative to the zero-point position. If a full rotation (360 degrees) of the adjusting cap 110' is desired, further rotating the adjusting cap 110' to resist the restoring force of the limiting member 147' is required. A full rotation (360 degrees) of the adjusting cap 110' can be completed by further rotating the adjusting cap 110' so that the abutting element 113 forces the sliding portion 1504 to move away from the first end portion 541, along the sliding space 1458 and against the second end portion 542. When the abutting element 113 is moved to push against the second side 1507 of the stop portion 1505 and the sliding portion 1504 is moved to push against the second end portion 542, the adjusting cap 110' is rotated through 360 degrees relative to the zero-point position and is unable to further rotate in the single direction. In brief, the adjusting cap 110' in the first position is constrained and stopped from rotating after a full rotation (360 degrees) in the single direction.

As above description, the adjusting cap 110' is constrained from rotating after a full rotation. If correcting bullet impact points is not completed yet, then the adjusting cap 110' can be pulled up to stop in the second position for moving the stop portion 1505 into the sliding space 1458 by the junk ring 117, so that the constraint of the stop unit 152' is removed. Because the stop portion 1505 is not placed against the abutting element 113, the sliding portion 1504 is pushed by the limiting member 147' to move away from the second end portion 542, along the sliding space 1458 and against the first end portion 541 again. Then, the adjusting cap 110' is released and is forced by the restoring force of the elastic element 213 to move to the first position, so that the abutting element 113 is moved to push against the first side 1506 of the stop portion 1505. Because the abutting element 113 is placed against the first side 1506 of the stop portion 1505 and the sliding portion 1504 is placed against the first end portion 541, the adjusting cap 110 is able to rotate in the single direction for completion of correcting bullet impact points. Besides, the user is able to record the completion of a full rotation of the adjusting cap 110' by adjusting the counting element 140.

(2) Restoring to the zero-point-set state: During the above described correction, if restoring the compensating mechanism 11' to the zero-point-set state is desired, then the adjusting cap 110' is rotated in a reverse direction of the single direction until rotation of the adjusting cap 110' is blocked. Specifically, when the adjusting cap 110' begins to rotate in the reverse direction of the single direction, the abutting element 113 is moved away from the second side 1507 of the stop portion 1505 so that the sliding portion 1504 is pushed by the limiting member 147' to move away from the second end portion 542, along the sliding space 1458 and against the first end portion 541. Because the abutting element 113 is placed against the first side 1506 of the stop portion 1505 and the sliding portion 1504 is placed against the first end portion 541 again, the adjusting cap 110' returns to the zero-point position and fails to rotate in the reverse direction of the single direction.

It is therefore understood that the constraint of the sliding element 150' on the abutting element 113 is removed when the adjusting cap 110' is pulled up to be in the second position. Further, the zero point for the compensating mechanism 11' can be reset when the adjusting cap 110' is placed in the second position, described in the following:

(3) Resetting the zero point for the compensating mechanism: After the first screw 123 is moved relative to the base 130' from the first reference position to a predetermined position, the predetermined position can be set as a second reference position if the adjusting cap 110' is pulled up to stop in the second position. When the adjusting cap 110' is stopped in the second position, the abutting element 113 is not placed against the sliding element 150' so that the adjusting cap 110' can be rotated without constraint. Therefore, the adjusting cap 110' can be rotated to the zero-point position for resetting the zero point for the compensating mechanism. In other words, after the zero point for compensating mechanism 11' is reset, the first screw 123 is placed in the second reference position and the adjusting cap 110' is still placed in the zero-point position. Similarly, when the adjusting cap 110' is placed in the zero-point position, the abutting element 113 is placed against the first side 1506 of the stop portion 1505, and the sliding portion 1504 is placed against the edge portion 543 and the first end portion 541. It is understood that the compensating mechanism 11' after the zero point is reset is operated in the same way (without change), and therefore the descriptions thereof are omitted.

In the second embodiment, the abutting element 113 is moved from the first side 1506 of the stop portion 1505 to the second side 1507 of the stop portion 1505 in the single direction and along a first curved path (not shown), and the first curved path corresponds to a first central angle. When the sliding portion 1504 is moved from the first end portion 541 to the second end portion 542, the abutting element 113 is further moved in the single direction and along a second curved path (not shown), and the second curved path corresponds to a second central angle. A sum of the first central angle and the second central angle is 360 degrees.

In a third embodiment, a compensating mechanism (not shown) does not include the above described junk ring 117. In other words, when an adjusting cap is stopped in a second position, a stop portion is not moved into a sliding space. However, it is understood that the compensating mechanism is capable of operating as above description, even if the junk ring 117 is omitted. When the adjusting cap is pulled up to be in the second position, the abutting element is at a predetermined altitude and a transmitting element is kept at the original altitude (as the altitude of the transmitting element 121 shown in FIG. 8A). That is, there is an altitude difference between the abutting element and the stop portion, and the constraint of a stop unit on the adjusting cap can be removed by means of the altitude difference. The arrangement of other elements and operation of the third embodiment are similar to those of the above embodiments, and therefore the descriptions thereof are omitted.

In a fourth embodiment, when an adjusting cap is stopped in a second position, the adjusting cap is configured to axially move a transmitting element of an adjusting unit with respect to a base. In other words, a sliding element carried by the transmitting element is capable of moving axially so that a stop portion has chances to be stopped at the same altitude as an abutting element (that is, the abutting element may be placed against the stop portion). However, it understood that even if the sliding element is capable of moving axially, the stop portion is moved into a sliding space by a junk ring (as the junk ring 117 shown in FIGS. 8A and 8B) to prevent the abutting element from pushing against the stop portion. The arrangement of other elements and operation of the fourth embodiment are similar to those of the above embodiments, and therefore the descriptions thereof are omitted.

In a fifth embodiment, a compensating mechanism (not shown) does not include the above described junk ring 117, and an adjusting cap is configured to axially move a transmitting element of an adjusting unit with respect to a base when positioned in a second position. That is, a stop portion of a sliding element has chances to be stopped at same altitude as an abutting element (that is, the abutting element may be placed against the stop portion). However, it understood that even if the junk ring 117 is omitted, the compensating mechanism is capable of operating as above description if an altitude of a lowest end of the abutting element is higher than a maximal altitude that the stop portion is capable of reaching when the adjusting cap is stopped in the second position. The arrangement of other elements and operation of the fifth embodiment are similar to those of the above embodiments, and therefore the descriptions thereof are omitted.

In a sixth embodiment, when an adjusting cap is stopped in a second position, the adjusting cap is configured to axially move a transmitting element of an adjusting unit with respect to a base. However, a sliding element is not capable of moving axially as the transmitting element. In this regard, an abutting element has no chance to be placed against a stop portion due to an altitude difference therebetween, and the compensating mechanism is therefore capable of operating as above description. The arrangement of other elements and operation of the sixth embodiment are similar to those of the above embodiments, and therefore the descriptions thereof are omitted.

In brief, when the compensating mechanism includes the above described junk ring 117 and the adjusting cap is stopped in the second position, the abutting element is prevented from pushing against the stop portion. When the compensating mechanism does not include the above described junk ring 117 and the adjusting cap is stopped in the second position, the abutting element is still prevented from pushing against the stop portion if a minimal altitude difference between the lowest end of the abutting element and the stop portion is provided.

In sum, the sight and the compensating mechanism 11, 11' of the invention are capable of achieving the "zero stop" function and are capable of resolving problem that the prior adjusting cap is not capable of rotating through 360 degrees. Since the compensating mechanism 11, 11' is capable of rotating through 360 degrees and is capable of carrying on rotating after the constraint is removed, arrangement and operation of the compensating mechanism 11, 11' are more intuitive to the user. It therefore significantly alleviates the burden that the user needs to remember how many degrees or clicks the compensating mechanism has already experienced by adjustment.

What is claimed is:

1. A compensating mechanism, comprising:
   a base;
   an adjusting unit disposed on the base;
   an adjusting cap connected to the adjusting unit and configured to rotate and move the adjusting unit with respect to the base so as to form a first circumferential movement range;
   a stop unit connected to the base and comprising a sliding element and a limiting element, wherein the limiting element comprises a limiting portion, the limiting portion comprises a movement region, and the adjusting cap is configured to move the sliding element along the movement region so as to form a second circumferential movement range;
   wherein a sum of a first central angle corresponding to the first circumferential movement range and a second central angle corresponding to the second circumferential movement range is a fixed value;
   wherein the limiting portion is an opening portion having a first end portion and a second end portion, the stop unit further comprises a limiting member having a first end and a second end, the first end is fixed to the limiting element, and the second end is configured to push against the sliding element so that the sliding element is forced against the first end portion.

2. The compensating mechanism as claimed in claim 1, wherein the adjusting cap comprises an abutting element and is configured to move the abutting element in a circumferential direction of the adjusting cap so as to form the first circumferential movement range; and
   wherein the limiting element is ring-shaped, and the sliding element is configured to move between the first end portion and the second end portion so as to form the second circumferential movement range.

3. The compensating mechanism as claimed in claim 2, further comprising a limiting screw and an elastic element, wherein the limiting screw penetrates through the elastic element and the adjusting cap and is fixed to the adjusting unit, the elastic element is compressed between the limiting screw and the adjusting cap and generates a restoring force, and the adjusting cap is pushed by the restoring force to stay in a first position.

4. The compensating mechanism as claimed in claim 3, wherein:
the sliding element has a stop portion and a sliding portion; and
when the adjusting cap stays in the first position, the abutting element is configured to push against the stop portion for moving the sliding portion between the first end portion and the second end portion, and the adjusting cap is configured to move the adjusting unit with respect to the base.

5. The compensating mechanism as claimed in claim 4, wherein:
the stop portion has a first side and a second side;
when the sliding portion is placed against the first end portion, the abutting element is allowed to move from the first side to the second side along a first curved path;
when the sliding portion is moved from the first end portion to the second end portion, the abutting element contacting the second side is moved along a second curved path; and
wherein the first curved path corresponds to the first circumferential movement range, the second curved path corresponds to the second circumferential movement range, and the sum of the first central angle and the second central angle is 360 degrees.

6. The compensating mechanism as claimed in claim 5, wherein when the sliding portion is placed against the first end portion and the abutting element is placed against the first side, the adjusting cap is limited to rotate in a single direction.

7. The compensating mechanism as claimed in claim 6, wherein when the sliding portion is placed against the second end portion and the abutting element is placed against the second side, the adjusting cap is limited to rotate in a reverse direction of the single direction.

8. The compensating mechanism as claimed in claim 3, wherein the elastic element is compressed in an amount of compression, and the adjusting cap is allowed to move with respect to the adjusting unit until the amount of compression reaches a predetermined value to stop the adjusting cap in a second position.

9. The compensating mechanism as claimed in claim 8, wherein when the adjusting cap is stopped in the second position, the abutting element fails to push against the sliding element, and the adjusting cap fails to move the adjusting unit with respect to the base.

10. The compensating mechanism as claimed in claim 2, wherein the stop unit further comprises a limiting member having a first end and a second end, the first end is fixed to the limiting element, and the second end is configured to push against the sliding element so that the sliding element is forced against the first end portion.

11. A sight, comprising:
a main body comprising a first end portion and a second end portion;
an objective unit connected to the first end portion;
an ocular unit connected to the second end portion;
an inner lens barrel disposed within the main body and between the objective unit and the ocular unit and comprising a plurality of lenses, wherein the objective unit, the inner lens barrel and the ocular unit constitute an optical axis; and
a compensating mechanism as claimed in claim 2;
wherein the compensating mechanism is disposed on the main body and against outer circumferential surfaces of the inner lens barrel so as to adjust the optical axis.

* * * * *